US008605718B2

(12) United States Patent
Hemar et al.

(10) Patent No.: US 8,605,718 B2
(45) Date of Patent: Dec. 10, 2013

(54) IMMEDIATE COMMUNICATION SYSTEM

(75) Inventors: Elad Hemar, Tel-Aviv (IL); Ronen Babayoff, Herzlia (IL)

(73) Assignee: Babitech Ltd., Herzlia (IL)

( * ) Notice: Subject to any disclaimer, the term of this patent is extended or adjusted under 35 U.S.C. 154(b) by 1135 days.

(21) Appl. No.: 11/991,164

(22) PCT Filed: Aug. 30, 2006

(86) PCT No.: PCT/IB2006/053024
§ 371 (c)(1),
(2), (4) Date: Feb. 28, 2008

(87) PCT Pub. No.: WO2007/026320
PCT Pub. Date: Mar. 8, 2007

(65) Prior Publication Data
US 2009/0262668 A1    Oct. 22, 2009

Related U.S. Application Data

(60) Provisional application No. 60/712,499, filed on Aug. 30, 2005.

(51) Int. Cl.
*H04L 12/16*   (2006.01)
*H04Q 11/00*   (2006.01)
*H04J 99/00*   (2009.01)
*H04M 3/42*    (2006.01)

(52) U.S. Cl.
USPC ....... 370/386; 370/259; 370/546; 379/201.02

(58) Field of Classification Search
None
See application file for complete search history.

(56) References Cited

U.S. PATENT DOCUMENTS

| 7,218,921 | B2 * | 5/2007 | Mendiola et al. | 455/414.1 |
| 2003/0210683 | A1 * | 11/2003 | Bais et al. | 370/352 |
| 2004/0058694 | A1 * | 3/2004 | Mendiola et al. | 455/466 |
| 2004/0128356 | A1 * | 7/2004 | Bernstein et al. | 709/206 |
| 2004/0131190 | A1 | 7/2004 | Nobel et al. | |
| 2004/0203977 | A1 | 10/2004 | Kennedy | |
| 2005/0027716 | A1 * | 2/2005 | Apfel | 707/100 |
| 2005/0034161 | A1 * | 2/2005 | Brown | 725/86 |
| 2006/0050683 | A1 * | 3/2006 | Wall et al. | 370/352 |
| 2006/0153162 | A1 | 7/2006 | Croak et al. | |
| 2006/0256772 | A1 * | 11/2006 | Yarlagadda | 370/352 |

FOREIGN PATENT DOCUMENTS

WO    WO 2007/026320    3/2007

OTHER PUBLICATIONS

International Preliminary Report on Patentability Dated Dec. 11, 2008 From the International Bureau of WIPO Re.: Application No. PCT/IB2006/053024.

* cited by examiner

*Primary Examiner* — Hassan Phillips
*Assistant Examiner* — Lonnie Sweet
(74) *Attorney, Agent, or Firm* — Pearl Cohen Zedek Latzer Baratz, LLP

(57) ABSTRACT

A communication service network, comprising:
(a) a communication network including a plurality of terminals configured to support at least a first personal communication service for a plurality of users over the communication network, in which service, each user has a unique handle; and
(b) a plurality of clients supporting a second personal communication service, wherein each of said clients is configured to attempt a communication under said second service with any of said users using their unique handles.

43 Claims, 11 Drawing Sheets

IMMEDIATE COMMUNICATION SYSTEM

RELATED APPLICATIONS

This application is a National Phase of PCT Patent Application No. PCT/IB2006/053024 having International Filing Date of Aug. 30, 2006,which claims the priority under 119(e) of U.S. Provisional Patent Application No. 60/712,499, filed on Aug. 30, 2005, by inventors Elad Hemar and Ronen Babayoff, the disclosure of which is incorporated herein, in its entirety, by reference.

FIELD OF THE INVENTION

The present invention relates to electronic communication systems, for example, to IP based communication systems allowing immediate/fast setup and/or connection of new users.

BACKGROUND OF THE INVENTION

There exist many communication systems designed for instant or near-instant communication between users, for example, radio, cellular telephones, satellite telephones, IP-telephony, instant messenger, video conferencing, broadband telephones, cable telephones and land-line telephones. This list is not exhaustive. In each of these communication methods, there are often multiple standards.

In order for one person to successfully communicate with another person using a communication system, both persons need to have access to an interface of the communication system. In addition, the initiator of the communication needs to have a handle or address of the second person. Typically, there exist directories listing the handles (e.g., telephone number) of the other person. Currently, a person may have multiple handles, including, cellular telephone number, land line number, instant messenger user ID, IP-telephony type, user ID and e-mail address.

If a person does not have a handle for the communication system which he wishes to use for communication, the person needs to register for that system, which may include various activities which take time, effort and provision of identification information.

One example of a typical registration process is found in Skype, a VOIP service. Similar processes are found in MSN and other instant messenger applications. In a typical usage, a first person sends an e-mail to a second person inviting him to sign up for Skype. This e-mail is sent via the Skype interface or as a regular e-mail mentioning the specific network ID/handle name (e.g., Skype name, ICQ #, hotmail/Gmail/Yahoo ID/e-mail address) of the e-mail sending/inviting user. The receiver of the e-mail can click on a button in the e-mail to open a download and/or registration page on a Skype portal. The registration is to a closed network. A closed network requires that you have an ID/name that allows access to the specific network. The receiver downloads the Skype application/client, installs it, and runs the application to register as a Skype user. Once this process is completed, the receiver may call back the initiator of the process using his installed Skype client, after entering the initiator's ID manually. In addition, each person that the receiver wants to communicate with needs to be found in the closed network or added to a contact list and be invited—in some cases this initiates the e-mail invitation process described above.

Some systems allow a shortened registration process. For example, the Google-talk instant messenger system allows a user to initiate/invite a user from a Google-mail user account. If the invited user is part of the closed group network (Gmail/Google Talk) and has a Gmail ID then the registration process is not needed. However, in this case, as in others, if the invited user doesn't have a Gmail ID/e-mail address, the invited user needs to join/register to the Gmail network and get a new Gmail ID.

It should be noted that e-mail is a unique personal communication network on the public Internet. Following are particular features of e-mail:

1. Has no significant competing networks that use the same communication type (e-mail).
2. Is based on open standards.
3. Is based on the Internet's universal (distributed) DNS database.
4. Anyone can get an Internet domain (so there are many providers of the service).
5. Any Internet domain can enable e-mail for it's domain by adding the domain's communication (e-mail) servers to the Internet's universal (distributed) DNS database e-mail specific entries.
6. The domain owner is responsible for the domain's communication (e-mail) servers.
7. The domain owner is responsible for the personal (e-mail) addresses under that domain and therefore can add any personal (e-mail) address he wishes under that domain.
8. Is the most popular personal communication network (by number of users with personal e-mail addresses) due to the above and due to the fact that:
    a. It is a mature personal communication network that started many years ago.
    b. Almost all Internet domain are open for e-mail communication, and even more so for domains belonging to organizations.
    c. The existing e-mail communication systems (both client and server) are highly compatible due to the maturity of the network.
    d. Anyone can get a personal e-mail address, either by:
        i. Starting one's own domain.
        ii. Joining an ISP—almost any ISP provides one or more e-mail addresses to anyone who joins its service—for free.
        iii. Join one of the numerous services that provide free e-mail accounts (Hotmail, Yahoo, Gmail, etc.).
    e. Almost any person belonging to an organization with an "e-mail enabled" domain gets an e-mail address under that domain (and usually uses it in his/her day-to-day activities).
9. Users within the network can communicate with each other, irrespective of the manner/provider in which they access the network.

Thus e-mail is an example of an Internet communication network that basically anyone can join, and without needing to register specific handles with any central authority. The telephone (including satellite and cellular) network has similar properties.

In comparison to other personal internet communication methods:

1. All the popular Instant Messaging communication networks on the public Internet (MSN, Yahoo, Google) require registration for their closed networks.
2. The Skype VOIP and IM service similarly requires registration to its closed network.
3. Jabber doesn't match at least items 1, 8 and 9 (is not widespread enough for regular users to trust for their communication needs, especially considering the closed networks).

4. The standardized SIP protocol (both for VOIP and IM) doesn't match at least items 1, 8 and 9 (is not widespread enough for regular users to trust for their communication needs, especially considering the closed networks).

SUMMARY OF THE INVENTION

A broad aspect of some embodiments of the invention relates to creating a universal-like communication service which allows users to communicate irrespective of the particular communication systems they are registered on, based on the availability of a communication handle for the user (of more limited communication ability), for example, an e-mail address or a telephone number. In an exemplary embodiment of the invention, the underlying service is a generally open communication network, such as the telephone network or an e-mail network in which there is no one provider that monopolizes the market and a significant percentage of people have an address. In an exemplary embodiment of the invention, by building upon an existing communication service for an existing network (e.g., the internet or telephone system), the new communication service can immediately reach a large number of users and/or continue practices of decentralization. In some embodiments of the invention, registration to the universal-like communication service is provided, but it is part of the communication process and optionally encapsulated in a communication attempt, rather than a separate registration process as in other systems and is not an a-priori requirement for being the target of a communication attempt.

In an exemplary embodiment of the invention, the properties of the underlying communication service are used to allow a user to register with a minimum of interaction and provide services which are based on these properties, as the communication service, from a logical perspective and in some embodiments of the invention may be considered a layer over the existing "universal" communication system.

In an exemplary embodiment of the invention, specific user authentication is not required by the new communication service and authentication is instead based on authentication of the underlying communication service.

In an exemplary embodiment of the invention, the existing network is based on a hardware and/or software set of protocols and typically supports multiple communication services. In an exemplary embodiment of the invention, the available handle used is one which is available to at least 50%, 70%, 80%, 90% or more of any users of the existing network. In an exemplary embodiment of the invention, this handle is automatically transferred to the universal-like communications service, even for users that are not registered and is a source of its being universal-like. In an exemplary embodiment of the invention, the universal-like communication service, after deployment, includes at least 100, at least 1,000, at least 10,000, at least 100,000, at least 1,000,000, at least 50,000,000 or intermediate numbers of registered users, typically each user with suitable client software.

In an exemplary embodiment of the invention, and using e-mail as the handle, existing e-mail clients (or other software or devices) are upgraded to provide the new communication service. In an exemplary embodiment of the invention, the process of upgrading is made transparent or nearly transparent to the user, especially with regard to data entry and exposure of personal information.

In an exemplary embodiment of the invention, the upgrade comprises adding controls to the software so that a user can use e-mail addresses as handles for the new communication service, when he views them, for example, in e-mail clients or in web pages (including webmail).

In an exemplary embodiment of the invention, the underlying communication service includes a plurality of providers, for example, at least 2, at least 10, at least 100, at least 1,000, or intermediate numbers.

A broad aspect of some embodiments of the invention relates to setting up of an electronic communication system for human use with a minimum of user input and/or interaction. In an exemplary embodiment of the invention, the setting up does not include a user-facilitated registration step. Optionally, registration and/or user validation is automatic and/or do not require extra steps beyond agreeing to join. In an exemplary embodiment of the invention, the user is not required to provide any input other than accepting standard settings and/or recommendations by the set-up process and/or identifying himself as a human (e.g., by performing a digit recognition task). In particular, in an exemplary embodiment of the invention, the user is not required to enter identifying information. In an exemplary embodiment of the invention, a same act of clicking on a control or a link is used both for validation and for requesting download or actually downloading a software client. In an exemplary embodiment of the invention, validation is carried out before registration and/or download.

An aspect of some embodiments of the invention relates to setting up a new communication service, using a user identification of an existing and unrelated communication service for the setting up. In an exemplary embodiment of the invention, the user identification comprises an e-mail address or telephone number. In an exemplary embodiment of the invention, the setting up is initiated by a party other than the user. In an exemplary embodiment of the invention, the communication service is an instant personal communication service, allowing person to person communication on a real-time or near real-time basis, for example, voice, video and/or text. In an exemplary embodiment of the invention, the initiation comprises a bona fida attempt at starting an actual communication, rather than a mere invitation. Failure of this attempt may cause a message (e.g., a callback request) to be left at the target of the communication (e.g., voice mail, SMS or e-mail). Optionally, however, complying with the callback request also attempts to set up the communication. In an exemplary embodiment of the invention, a user of the new communication service performs a same action whether or not a target of a communication attempt is registered at the new communication service.

In an exemplary embodiment of the invention, the user identification at the existing service is used to contact and/or identify the target of the communication attempt (e.g., for the new communication service).

In an exemplary embodiment of the invention, the existing communication service (e.g., e-mail) and/or user identification is used for validating the user, as part of the set-up.

In an exemplary embodiment of the invention, the existing user identification comprises an e-mail address. In an exemplary embodiment of the invention, the new service comprises a service including real-time voice communication.

In an exemplary embodiment of the invention, the new communication service uses the existing handle or a variant thereof as a handle. For example, an e-mail of "x@y.com" may be used as a handle "x@y.com" or as "x!y.com@service.com"

In an exemplary embodiment of the invention there is no need to explicitly register with the new communication service, e.g., at a website and/or through a client installation (e.g., no need for a .NET or Windows Live-like passport).

Optionally, registration is based on an e-mail address verification and an optional automatic password creation.

In an exemplary embodiment of the invention, the new communication service can be used to contact other users without the need to search for and/or add and/or manually enter another user's network ID.

In an exemplary embodiment of the invention, the new communication service and/or a communication attempt can be initiated from within existing 3rd party applications and/or web sites, including ones used by an existing communication service. In an exemplary embodiment of the invention, 3rd party software and/or web sites are those generated for their own reasons and not for supporting the present methods. However, such 3rd party software and/or websites may include features that are adapted to support methods as described herein.

In an exemplary embodiment of the invention, a user can communicate using the existing handle (e.g., e-mail), regardless of the service provider of the handle. In an exemplary embodiment of the invention, if the target of a communication attempt does not have an "active" new communication service account, the initiating user can send a message to the handle. Optionally, such sending is automatic. Optionally, the message includes means for the target to "activate" a communication service account and callback/communicate back with the sending user. Alternatively or additionally, the message causes the use of an existing service used by the target of the communication attempt.

In an exemplary embodiment of the invention, the new communication service operates without servers, for VOIP and/or IM (Immediate Messaging). Optionally, at least one central server exists, for storing a handle database and/or coordinating sign-on, however, even this is not essential, for example, if a distributed database is used (e.g., distributed among clients). Optionally, a central location server is provided for VOIP use, for example if a peer-to-peer structured overlap is not used.

In an exemplary embodiment of the invention, the new communication service is a peer-to-peer service. In an exemplary embodiment of the invention, the service is a server based service, for example one in which data and/or communication messages transmitted from a source to a destination always pass through a server. In an exemplary embodiment of the invention, the service uses one or more servers to provide some services in a peer-to-peer communication configuration.

In an exemplary embodiment of the invention, the new communication service comprises a gateway between (and/or to or from) existing communication services (such as VOIP and telephone).

In an exemplary embodiment of the invention, the new communication service comprises a different service type from the existing service whose handle is used for addressing, for example, the existing service being e-mail and the new service being VOIP or IM.

In an exemplary embodiment of the invention, the new communication service is used to set up a communication service supported by the initiating party. Optionally, the user identification is identified as not belonging to the new communication service and thereby used to initiate joining of the user to the communication service.

An aspect of some embodiments of the invention relates to setting up a communication service in which a same handle is used for validation and for identification of a user. In an exemplary embodiment of the invention, the handle, for example, e-mail address or a cellular telephone number, is used both as an identifier for the user in the new communication system and to validate that the user presenting the handle has access to a device which is at least moderately secure and uses that handle, thereby validating the user.

In an exemplary embodiment of the invention, a new communication service is set up by entering a handle (for example e-mail-address or phone number) and with no other information in a website and requesting to join by clicking a button or using another approval method. This click triggers the sending of a message (e.g., e-mail message, SMS) with a link/button (e.g., an address). A click on the link/button will enable the new communication service, resulting in the ability of a call/connection, on the new communication service.

In an exemplary embodiment of the invention, the new communication service allows calling/communicating with any identified handle (e.g., e-mail address, phone number). A click to communicate, by an initiating party, results in a connection or in a message (e.g., e-mail, SMS) to the identified handle to "communicate back".

In an exemplary embodiment of the invention, the new communication service is set up by a party by simply clicking on a "communicate back" button and/or link. This click triggers the process of enabling the new communication service and eventually resulting in a call/connection back on the new communication service.

In an exemplary embodiment of the invention, an e-mail client (or other client that uses the handle) is used to validate subsequent usages of the communication system by a user, for example, assuming that access to a webmail account of a handle or access to an e-mail client on which a received e-mail is located and/or handle is set up, means that access is legal.

An aspect of some embodiments of the invention relates to setting up a communication system in response to a query from a person and including automatically calling back the querying person at the end of the setup. In an exemplary embodiment of the invention, the setup process only requires accepting standard settings (e.g., an EULA, download approval, installation approval) and/or an indication that the process is being carried out by a human (rather than a software robot).

An aspect of some embodiments of the invention relates to a process of setting up a communication system, in which a user is only required to enter a user handle and possibly accept standard settings. In an exemplary embodiment of the invention, after entering the handle, the user clicks on a button to initiate a process, which, except for accepting (or rejecting) standard settings and/or making binary choices (or other limited number of forced choices, for example, 3, 4, 6, 10 or intermediate numbers) and without requiring data entry, and especially not personal data entry, culminates in a working communication system. Optionally, a user can add personal information, for example a desired nickname. Optionally, the setting up is via a remote connection. In an exemplary embodiment of the invention, the user is not required to enter textual information not known already to the communication service.

In an exemplary embodiment of the invention, setting up a communication system includes user validation, user registration and optionally login and/or contact importation. In an exemplary embodiment of the invention, using an e-mail address or another communication handle for setting up allows validation to be made by ensuring that a setting up is via an e-mail client and/or account which receives e-mail messages to that handle. Optionally, a password is created automatically and used for the login.

In an exemplary embodiment of the invention, the user is automatically assigned a password and logged in during set up, so the user has no need to define a password and to initially know his password.

In an exemplary embodiment of the invention, setting up includes automatic importation of contacts, for example, importing from an e-mail client software, such as Outlook or from a VOIP service. Optionally, such import includes analyzing sent items. In an exemplary embodiment of the invention, importing includes importing from web-mail accounts, for example, Hotmail. In an exemplary embodiment of the invention, importing is by instigating and/or tracking login by the user into a web mail server and at that time, once logged in, downloading contact data from the remote server, by a local client. In an exemplary embodiment of the invention, logging in uses default passwords stored on the local client computer, for example as cookies, which the user is optionally not required to remember and/or enter.

An aspect of some embodiments of the invention relates to a communications set-up method in which a user is offered to change a password only upon logging out and/or signing out from the system and without previously knowing the password. In an exemplary embodiment of the invention, the user is automatically assigned a password and logged in during set up, when the user has no opportunity to know his password.

An aspect of some embodiments of the invention relates to configuring a communication system including accessing user settings and/or data on remote systems without requiring a user to enter passwords normally required for access to such remote systems. In an exemplary embodiment of the invention, the communication systems identifies when a user logged on to such a remote system or initiates an automatic logon to the remote system (which may use internally stored passwords) and once connected accesses settings and/or data on the system.

An aspect of some embodiments of the invention relates to a self configuring communication system which downloads data and/or settings from a communication system associated with the user and having a different type (e.g., different type of real time and/or different type of media) from that of the self-configuring communication system. In an exemplary embodiment of the invention, the downloading is from at least two different communications systems associated with a user, the different communications systems optionally using different types of communication types, for example, VOIP and e-mail. Alternatively or additionally, data and/or settings are extracted from two or more communication systems of a same type.

In an exemplary embodiment of the invention, data imported from a service (e.g., an e-mail client) is used for things other than importing contacts. In one example, the data is used to decide which handle is to be used for call hunting.

An aspect of some embodiments of the invention relates to generating a contact list for a new communication service in a plurality of steps.

In an exemplary embodiment of the invention, the contact list is generated in two steps, in a first "fast" step, only some contacts are imported, for example, contacts that are more readily available. Optionally, this allows a user to be up and running faster. In a second "slow" step, substantially all relevant contacts and/or details are imported. For example, in importing contacts from a web-mail system, the first import may include only the first N items or only items with a handle in the web page (and not requiring following links) or only the first N pages of contacts. In another example, a fast import imports contacts listed in a contact list and a slower, second step includes analyzing sent items and/or logs for recipients.

In another example, fast import includes importing all contacts, but not contact information found in underlying pages (e.g., in web mail). Optionally, more than two steps are used. Optionally, the second step is carried out in the background.

In an exemplary embodiment of the invention, a contact list is generated without requiring a user to provide a password to access password protected contacts (e.g., contacts stored on a web-mail system). In an exemplary embodiment of the invention, the generation causes a computer system and/or a user to log into the service having protected contacts and then reading the contacts (and/or analyzing sent items and/or logs).

An aspect of some embodiments of the invention relates to attempting to set up a communication with a person by automatically hunting for the contact using a plurality of handles of the contact, for a plurality of communication systems, where the hunting and subsequent communication use a single communication system. In an exemplary embodiment of the invention, a call-back message is provided on handles that do not succeeded in completing the contact, which call-back messages point to the single communication system. Optionally, the hunting takes into account the habits of the contact.

An aspect of some embodiments of the invention relates to a communication system that adds contact controls to displays of other communication systems and/or data display applications, such as e-mail applications and/or WWW browsers. In an exemplary embodiment of the invention, the contact controls are added, on screen, next to displayed handles that relate to a plurality of different types of communication systems, for example, telephone numbers, e-mail addresses and VOIP IDs and instant messenger IDs. Optionally, the adding is as part of a displayed window or HTML (or XML) document. Alternatively, it may be added as an overlay or using any means of adding controls and/or information known in the art.

An aspect of some embodiments of the invention relates to providing an on-screen contact control for performing a communication type, next to a handle that is not native to that communication type, for example, a button for starting an IM session located near an e-mail address. In an exemplary embodiment of the invention, the button is automatically added by software not commercially associated with software whose display includes the handle. Optionally, a database is included to translate the handle into a handle for the other communication type.

In an exemplary embodiment of the invention, adding contact controls and/or performing a callback (e.g., a communication attempt) from an on-screen handle are functions provided bundled with a device, for example, a cellular telephone. Optionally, the functions are provided as firmware or hardware. Alternatively or additionally, the functions are provided as installable software.

An aspect of some embodiments of the invention relates to presenting advertisements to a user of a communication system only after a connection is created between the user and a contact person/handle. In an exemplary embodiment of the invention, maintenance of the connection is optionally coupled to continued presentation of the advertisement and/or continued attention to the advertisement. In an exemplary embodiment of the invention, using advertisements, the communication system's basic services are provided for free and include interfacing with other types of communication systems. Optionally, free services include one or both of calls to landline and mobile telephones.

There is thus provided in accordance with an exemplary embodiment of the invention, a communication service network, comprising:

(a) a communication network including a plurality of terminals configured to support at least a first personal communication service for a plurality of users over the communication network, in which service, each user has a unique handle; and (b) a plurality of clients supporting a second personal communication service, wherein each of said clients is configured to attempt a communication under said second service with any of said users using their unique handles.

In an exemplary embodiment of the invention, said second service is managed by an entity not affiliated with first communication service.

In an exemplary embodiment of the invention, said first service comprises a multi-provider service.

In an exemplary embodiment of the invention, said second communication service is of a type different from said first communication service. Optionally, said services differ in a protocol used. Alternatively or additionally, said services differ in a media carried. Alternatively or additionally, said services differ in degree of real-time.

In an exemplary embodiment of the invention, said first communication service comprises e-mail.

In an exemplary embodiment of the invention, said first communication service comprises telephone communication.

In an exemplary embodiment of the invention, the network comprises at least one server which manages a mapping between said unique handle and a handle used internally by said second communication service.

In an exemplary embodiment of the invention, said second communication service is managed as a peer-to-peer network in which clients direct data content of messages directly from one to another or via one or more relaying peer over said network.

In an exemplary embodiment of the invention, the network comprises a set-up server configured to validate and register new users of said second service based on said unique handle.

In an exemplary embodiment of the invention, the network comprises at least one gateway accessible to said clients for communication with a third personal communication service.

In an exemplary embodiment of the invention, at least one of said clients is configured to add controls for using said second communication service on existing software displays showing said unique handle. Optionally, the existing software comprises a client for said first communication service. Alternatively or additionally, at least one of said controls shows presence information.

In an exemplary embodiment of the invention, at least one of said clients is configured to import contact information used for said first communication service for use with said second communication service.

In an exemplary embodiment of the invention, at least one of said clients is configured to import contact information used for communication services other than said second communication service for use with said second communication service.

In an exemplary embodiment of the invention, at least one of said clients is configured to track contact information use for communication services other than said second service, on user computers on which the client is installed.

In an exemplary embodiment of the invention, at least one of said clients is configured to import contact information for communication services other than said second service, on user computers on which the client is installed.

In an exemplary embodiment of the invention, at least one of said clients is configured to mirror contact information for communication services other than said second service, on user computers on which the client is installed.

In an exemplary embodiment of the invention, at least one of said clients is configured to facilitate the set up of a conference call with multiple users of said first service, that are not users of said second service, and users of said second service, inviting said users to said conference call. Optionally, at least one of said users are users of a third communication service and wherein said set-up comprises connecting the conference to said third service.

In an exemplary embodiment of the invention, at least one of said clients is provided bundled with a wireless portable communication device.

In an exemplary embodiment of the invention, at least one of said clients is configured on a terminal of said terminals to display media to a user during a communication via the second communication service.

In an exemplary embodiment of the invention, at least one of said clients is configured to analyze a target computer during an installation process to identify communication software to be dealt with during usage of said client. Optionally, said client is configured to detect webmail usage. Alternatively or additionally, said client is configured to detect e-mail client.

There is also provided in accordance with an exemplary embodiment of the invention, a method of communicating with a user using a second communication service, comprising:

(a) selecting, a by a first user a second user to communicate with using a second personal communication service, said selecting being done without knowing by said first user if said second user is registered to said second communication service;

(b) attempting to set up a communication under said second communication service with said second user, via a software client of said first user, using a unique handle of said second user on a first personal communication system. Optionally, the method comprises leaving a callback request message under said first communication service with said second user, if said second user is not registered to said second communication service.

In an exemplary embodiment of the invention, said callback uses a communication protocol supported by said second communication service.

In an exemplary embodiment of the invention, the method comprises completing said communication by said second user activating a control in said message, which control causes the setting up of said second user with said second communications service, said setting up including noting to call back of said first user. Optionally, said setting up culminates in an attempt to call back said first user, using said second communication service, based on said noted callback request.

In an exemplary embodiment of the invention, said setup does not require any user input of information not known to said second communication service, to set up the second user.

There is also provided in accordance with an exemplary embodiment of the invention, a method of setting up a personal communication service, comprising:

(a) providing a user-unique handle under a first, multi-provider, personal communication service; and (b) validating and automatically generating a connection password for the user in a second personal communication service using said handle. Optionally, the method comprises registering said user based on said handle. Optionally, registering comprises recording said providing a handle. Optionally, registering comprises activating said user in said second service when said user logs on.

In an exemplary embodiment of the invention, said second personal communication service is not commercially associated with said first service, In an exemplary embodiment of the invention, validating comprises trusting a validation under said first service. Optionally, validation comprises determining that the user has access to said first communication service using said handle.

In an exemplary embodiment of the invention, said handle comprises e-mail. Optionally, validating comprises sending an e-mail to said e-mail address, which e-mail requires an activation of a control thereon to complete service setup on a client computer.

In an exemplary embodiment of the invention, providing a handle comprises user entry of said handle in a sign-up portal.

In an exemplary embodiment of the invention, providing a handle comprises receiving by the user a message with said handle and providing the handle from the message. Optionally, the method comprises calling back to a sender of said message after said setup, said set up storing a handle of said sender.

In an exemplary embodiment of the invention, the method comprises logging on said user to said second service. Optionally, said user does not see said password.

In an exemplary embodiment of the invention, the method comprises installing a client of said second communication service on a device of said user. Optionally, said user is validated and registered prior to said installing.

In an exemplary embodiment of the invention, the method comprises importing contact information for a plurality of contacts associated with said first service, into said second service. Optionally, importing comprises importing based on said handle. Optionally, importing comprises importing contact information for a contact if it is addressed from a message originating using said handle.

In an exemplary embodiment of the invention, the method comprises analyzing a communication device of said user for indications of communication services, including said first communication service. Optionally, analyzing comprises analyzing for webmail usage.

In an exemplary embodiment of the invention, said validation and password generation is part of a set-up process which does not require any user input of information not known to said second communication service, to set up the second service.

There is also provided in accordance with an exemplary embodiment of the invention, a method of setting up a personal communications service, comprising:

(a) attempting, by a first user to communicate with a second user, said attempt including leaving a callback message for the second user;

(b) activating said callback message by said second user, said activating including setting up of said second user with the personal communication service and noting a handle associated with the message from said first user; and (c) calling up said first user, by said second user, based on said noting.

Optionally, said noting comprises storing a handle of the source of said message on a computer of said first user and wherein (c) comprises at least offering to set up a call to said handle as soon as the setting up is complete.

In an exemplary embodiment of the invention, said noting comprises storing a handle of the source of said message on a computer of said first user and wherein (c) comprises at least offering to set up a call to said handle before the setting up is complete.

In an exemplary embodiment of the invention, said setting up does not require any user input of information not known to said communication service, to set up the second user.

There is also provided in accordance with an exemplary embodiment of the invention, a method of setting up a communication service, comprising:

(a) requesting by a user to set up a communication service, said request consisting essentially of an existing handle for the user in a different communication service and a confirmation of the request; and (b) automatic setting up of the user for the service, wherein the setting up does not required the user to provide information not known to the communication service in a manner other than limited-option forced choice. Optionally, said requesting is by handle entry and control activation at a web site. Alternatively or additionally, said requesting is by activating a control in an e-mail message, which activation sends said handle.

In an exemplary embodiment of the invention, said activation causes an automatic validation of said user for said setup.

In an exemplary embodiment of the invention, said activation causes software download for said setting up.

In an exemplary embodiment of the invention, setting up includes validating the user to the second communication service.

In an exemplary embodiment of the invention, setting up includes registering the user with the second communication service.

In an exemplary embodiment of the invention, setting up includes installing and configuring a software client on a computer of said user. Optionally, said installing and configuring is performed after validation and registration.

In an exemplary embodiment of the invention, setting up includes importing contacts stored for third party communication by said user. Optionally, importing contacts comprises importing password protected contacts without asking said user for a password.

There is also provided in accordance with an exemplary embodiment of the invention, a method of changing a user password in a communication system, comprising:

(a) automatic logging on by a communication software client of a user, wherein said user does not know a password used for said logging on; and (b) at a sign out of said client, asking said user for a new password, for purposes of password change. Optionally, said automatic logging in comprises logging in as an installation process of said client is completed.

There is also provided in accordance with an exemplary embodiment of the invention, a method of configuring a communication client, comprising:

(a) providing a communication software installed on a device having access to password-protected contact information that is stored at a remote location on an insecure wide area connection with said device and managed by a different software; and (b) importing of contact information by said software without requiring a user to explicitly provide a password for access to said information. Optionally, said remote location has a password for access stored on said device. Optionally, said password is an automatically saved default password or hash thereof.

In an exemplary embodiment of the invention, said password is not accessible in a usable form by said communication software.

In an exemplary embodiment of the invention, the method comprises automatically detecting a successful connection to said remote location by said device. Optionally, instigating a connection attempt for said connection by said software.

In an exemplary embodiment of the invention, said remote location comprises a webmail server.

In an exemplary embodiment of the invention, said software comprises a web browser modification.

In an exemplary embodiment of the invention, the method comprises avoiding pop-up blockers by simulating user actions at said web browser.

There is also provided in accordance with an exemplary embodiment of the invention, a method of configuring contacts for a communication service, comprising:

(a) providing a communication service client which supports a first type of communication; and (b) associating with said client contact information stored in association with a second communication service that supports a second, different, type of communication; and (c) making said contact information available for a client of said second communication service for use in communication attempts.

In an exemplary embodiment of the invention, associating comprises importing.

In an exemplary embodiment of the invention, associating comprises linking to already stored contact information.

In an exemplary embodiment of the invention, associating comprises tracking usage.

In an exemplary embodiment of the invention, tracking comprises detecting changes in one or more of contact existence and details.

In an exemplary embodiment of the invention, tracking comprises detecting usage of a contact handle as part of a communication.

In an exemplary embodiment of the invention, associating comprises associating contact information from a plurality of services supporting different communication types.

In an exemplary embodiment of the invention, associating comprises associating with contacts in both local and remote storage.

There is also provided in accordance with an exemplary embodiment of the invention, a method of setting up contact information in a communication client, comprising:

(a) first automatic importation of some contact information from a contact information source, said first importation having a first duration;

(b) using said client with said imported contact information; and (c) second automatic importation of additional contact information from said contact source after using said client with said imported contact information, said second importation having a second duration greater than said first importation.

Optionally, said first importation is limited by time, such that if not limited by time, more contact information would have been collected. Alternatively or additionally, said first importation is limited by depth of analysis. Alternatively or additionally, said first importation is limited by number of contacts imported. Alternatively or additionally, said first importation is limited by number of information pages accessed. Alternatively or additionally, said additional contact information comprises contact details on contacts imported during said first importation. Alternatively or additionally, said using comprises calling back a person.

In an exemplary embodiment of the invention, the method comprises calling back a person using said communication client before said first import, said first importation being automatically initiated.

In an exemplary embodiment of the invention, the method comprises third automatic importation by tracking of at least one of contact usage and contact display on a device associated with said client.

There is also provided in accordance with an exemplary embodiment of the invention, a method of contacting a call recipient, comprising:

(a) generating one request to set up a call with a call recipient;

(b) automatically and in response to said request, generating a plurality of call attempts, each one using a different communication service; and (c) consolidating the attempts and replies thereto.

Optionally, consolidating comprises stopping an attempt when another attempt is successful. Alternatively or additionally, consolidating comprises leaving a plurality of callback messages and matching up callback attempts by the recipient with the original call request. Optionally, the method comprises leaving fewer messages than all call attempts at least one communication service where a message is left.

In an exemplary embodiment of the invention, the different communication services of said plurality of call attempts comprise a plurality of different communication types.

In an exemplary embodiment of the invention, generating the plurality of call attempts comprises applying the attempts in series. Optionally, the method comprises ordering said call attempts based on cost considerations.

In an exemplary embodiment of the invention, generating the plurality of call attempts comprises applying the attempts in parallel.

There is also provided in accordance with an exemplary embodiment of the invention, a method of display control, comprising:

(a) providing a device on which a communication client is executing;

(b) executing on said device at least one software which is configured to generate a display;

(c) identifying at least two contact handles of different service types on a display generated by said software; and (d) adding a control next to each one of said at least two handles, said control being identifiable by said client, which performs an act responsive to activation of the control. Optionally, adding a control, comprises adding at least two controls for at least one of said handles.

In an exemplary embodiment of the invention, said act is different for at least two different controls.

In an exemplary embodiment of the invention, said software comprises a communication software supporting a service other than that of said client.

In an exemplary embodiment of the invention, said software comprises an internet browser.

In an exemplary embodiment of the invention, said control includes presence display for at least one handle of a type which whose native communication service does not support presence information.

In an exemplary embodiment of the invention, providing a device comprises providing a bundled device.

In an exemplary embodiment of the invention, providing a device comprises providing a wireless device.

There is also provided in accordance with an exemplary embodiment of the invention, a method of display control, comprising:

(a) providing a device on which a communication client is executing;

(b) executing on said device at least one software which is configured to generate a display;

(c) identifying at least one contact handle displayed by said software; and (d) adding a control next to said handle, said control being identifiable by said client, which performs an act responsive to activation of the control, said act including setting up a communication of a type not supported by a native communication network of said handle.

Optionally, said handle comprises e-mail. Alternatively or additionally, said act comprises setting up an IM communication. Alternatively or additionally, said act comprises setting up a VOIP communication. Alternatively or additionally, said act comprises setting up a video communication. Alternatively or additionally, said act comprises setting up an online collaboration.

There is also provided in accordance with an exemplary embodiment of the invention, a method of advertising during a call, comprising:

(a) allowing a user to request to set up a call without viewing advertisements;

(b) setting up the call; and (c) upon the call being set up, displaying an advertisement.

In an exemplary embodiment of the invention, the method comprises terminating the call if the advertisement is removed. Alternatively or additionally, the method comprises not providing advertisements until said call is set up.

BRIEF DESCRIPTION OF THE FIGURES

The following figures are used to describe exemplary embodiments of the invention, together with the following description. Same or similar items in the figures are generally referenced with same or similar reference numbers.

DETAILED DESCRIPTION OF EXEMPLARY EMBODIMENTS

Overview

Figure 1:
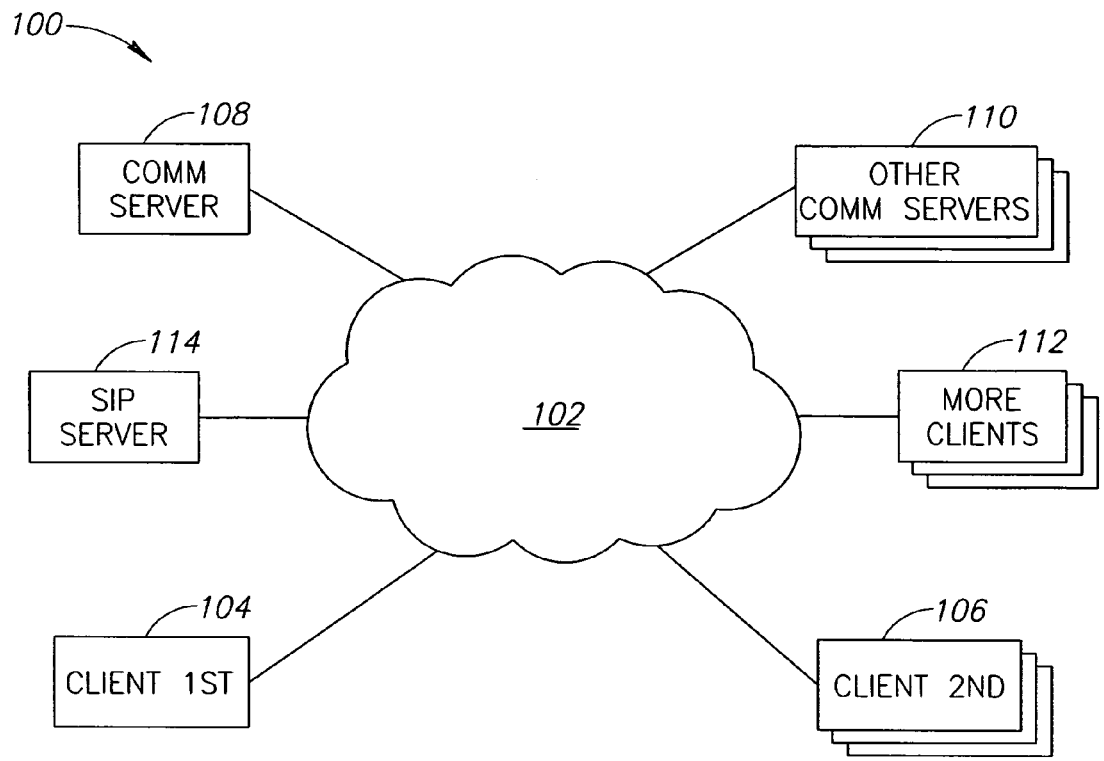
FIG. 1 is a schematic block diagram of a system configuration useful for communication systems and/or methods in accordance with an exemplary embodiment of the invention.

FIG. 1 is a schematic block diagram of a system configuration 100 useful for communication systems and/or methods in accordance with an exemplary embodiment of the invention. A network 102, for example an Internet, intranet or other packet based network, interconnects a plurality of clients, including a first client 104, a second client 106 and, optionally, a plurality of additional clients 112. The clients are optionally provided as personal computers with suitable software, however, other clients may be provided as well, for example dedicated hardware devices (e.g., cellular telephones) designed to connect to a communication network, as described below. One or more existing communication servers 110 may be interconnected as well, for example, servers of one or more communication protocols and/or service providers. In an exemplary embodiment of the invention, at least one of the other communication servers 110, and often nearly all of them, are for closed networks which require registration in order to be used (e.g., Skype, Vonage, ICQ).

A communication server 108 is optionally provided for supporting the protocols described herein and/or for providing services associated with communication in accordance with exemplary embodiments of the invention. It should be noted, however, that some embodiments of the invention, for example, fast registration may be practiced using existing communication servers 110.

In an exemplary embodiment of the invention, the communication service uses a SIP protocol, for example, managed by a SIP server 114 (e.g., of a type used by other communication services as well, such as Vonage or Enterprise Sip servers). In an exemplary embodiment of the invention, server 114 provides support for a standard communication protocol. Services such as SIP proxy, location tracking and/or SIP registration may be provided, for example, by server 114 or by server 108, depending on the implementation.

Figure 2:
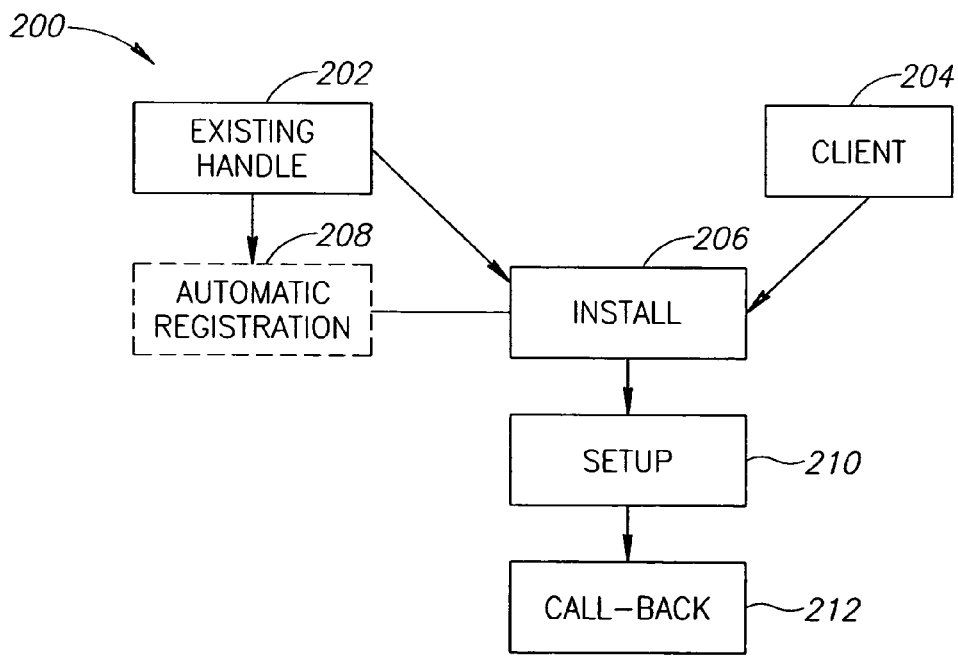
FIG. 2 is a simplified flowchart of a process of joining a communication service in accordance with an exemplary embodiment of the invention.

FIG. 2 is a simplified flowchart of a process 200 of joining a communication service in accordance with an exemplary embodiment of the invention. In the example described below, a first user of first client 104 is joining the communication service, optionally at the instigation of a user of second client 106. In the following, the reference 104 is used to designate both the first user 104 and the first client 104.

At 202 an existing handle for the first user (104) is provided. This may be, for example, by entry of second user 106, analysis of the first user's computer and/or by invitation or callback request. Additional details are provided below.

It is a particular feature of some implementations of the invention that the handle used is an e-mail address of the first user. E-mail shares three useful properties, one or more of which are used in exemplary embodiments of the invention. First, many users have an e-mail address, and such addresses are unique. Second, e-mail can be used to leave messages that a user can act on easily to join the communication system. Third, e-mail is usually set up in an at least moderately secured manner and the e-mail channel may thus be used to validate the user identity. In an exemplary embodiment of the invention, the uniqueness of the e-mail is used by assuming that a user can be identified in a unique manner, also in the communication system, by the same handle (e-mail) by which he is identified in a previous system. In an exemplary embodiment of the invention, this assumption is used to avoid user-intervention during registration of the user in the communication system.

At 204, client software for using the communication service is optionally provided to first client 104, for example by download or e-mail (additional details below).

At 206 the client software is installed on first client 104. In some cases, no installation is required, for example, if the software client comprises an Ajax module, for example, for IM communication. Intermediate levels of installation are contemplated as well, for example Java applets that are installed and execute only within a browser.

At 208, the first user 104 is automatically registered with the communication service, using the handle. In an exemplary embodiment of the invention, the registration is carried out by the user clicking on a joining request (and a suitable registration being done in server 108 in response) and before any client software is sent (e.g., before or in parallel with act 206). It is a particular feature of some embodiments of the invention that a user is not required to perform any act associated with process 200 except for accepting actions (e.g., allowing installation on a computer) and/or selecting between options. In an exemplary embodiment of the invention, the registration process includes automatic validation which is performed via the e-mail.

In some embodiments of the invention, in selecting between options and/or in accepting actions, the first user 104 is required to select between fewer than 16 options, fewer than eight options or even not more than four options, so as to make the selection simple.

At 210, the client software is set-up, for example, importing contacts. Additional details are provided below. Optionally, set up is at least partially carried out after 212 (callback), for example, contact import may wait until after callback.

At 212, if the handle was provided as part of a communication attempt by another user (e.g., second client 106), an attempt is optionally made to complete the communication by communicating back to the another user (106) who initially attempted to communicate. This is optionally referred to as a callback or immediate callback.

It is a particular feature of some embodiments of the invention that the user initiating communication can initiate communication in a same manner whether or not the target of the communication is registered for the communication service. It is noted that e-mail currently has the property of being widespread and a nearly universal handle for digital communications, but this property may be superseded by cellular telephone numbers.

The communication service may be of various types. In an exemplary embodiment of the invention, the service includes one or more of the following media abilities:
  (a) Speech, real-time and/or messages;
  (b) video, real-time and/or messages;
  (c) Text—real-time and/or messages;
  (d) files, including, for example, images, music, emoticons, video, other media types, data and executables.
  (e) known communication methods, such as IM, VOIP;
  (f) SMS, and other cellular data exchange protocols;
  (g) data sharing, for example as used in desktop sharing, document sharing, application sharing and/or online collaboration; and/or
  (h) exporting data, for example, from internal databases, for example, presence data or data indicating what subject is handled by the contact, for example, for users contacting a service provider or government office. Optionally, the indicating data is provided based on authorization levels defined for the data and/or users (e.g., a user can see who handles his matter—for example an insurance agent in an insurance agency), but not who else is handled by that agent.

In an exemplary embodiment of the invention, the communication service allows communication (initiating and continuing) with a client supporting the same communication service. Optionally, the service allows communication with clients using other communication services, for example, one or more of (and optionally not including an installed client of the service as described herein):
  (a) IM (e.g., one or more providers, such as ICQ and Microsoft)
  (b) VOIP (e.g., one or more providers, such as Skype, Vonage), IP telephones, enterprise PBX, or any other service/network supporting a communication protocol supported by (or gated by) the new communication service;
  (c) telephones, including one or more of cellular, local, long distance, satellite; and
  (d) clients that support a protocol (or act as servers to), where there is no particular provider, for example, one or more of Jabber (client or server), IMPP, SIP proxy, SIP user agent.

In an exemplary embodiment of the invention, one or more gateway servers are provided to translate between communication protocols. Alternatively or additionally, the translation, at least for some protocols, is carried out by one or both of the communicating clients. One or more features as described in the above mentioned US provisional application, the disclosure of which is incorporated herein by reference, may be provided by a communication system in accordance with an exemplary embodiment of the invention.

Exemplary Client

Following is a general description of a client and a server, indicating exemplary functional elements, not all of which need be provided. Usage of these elements is expanded on in later sections where particular exemplary processes are described in detail.

Figure 3:
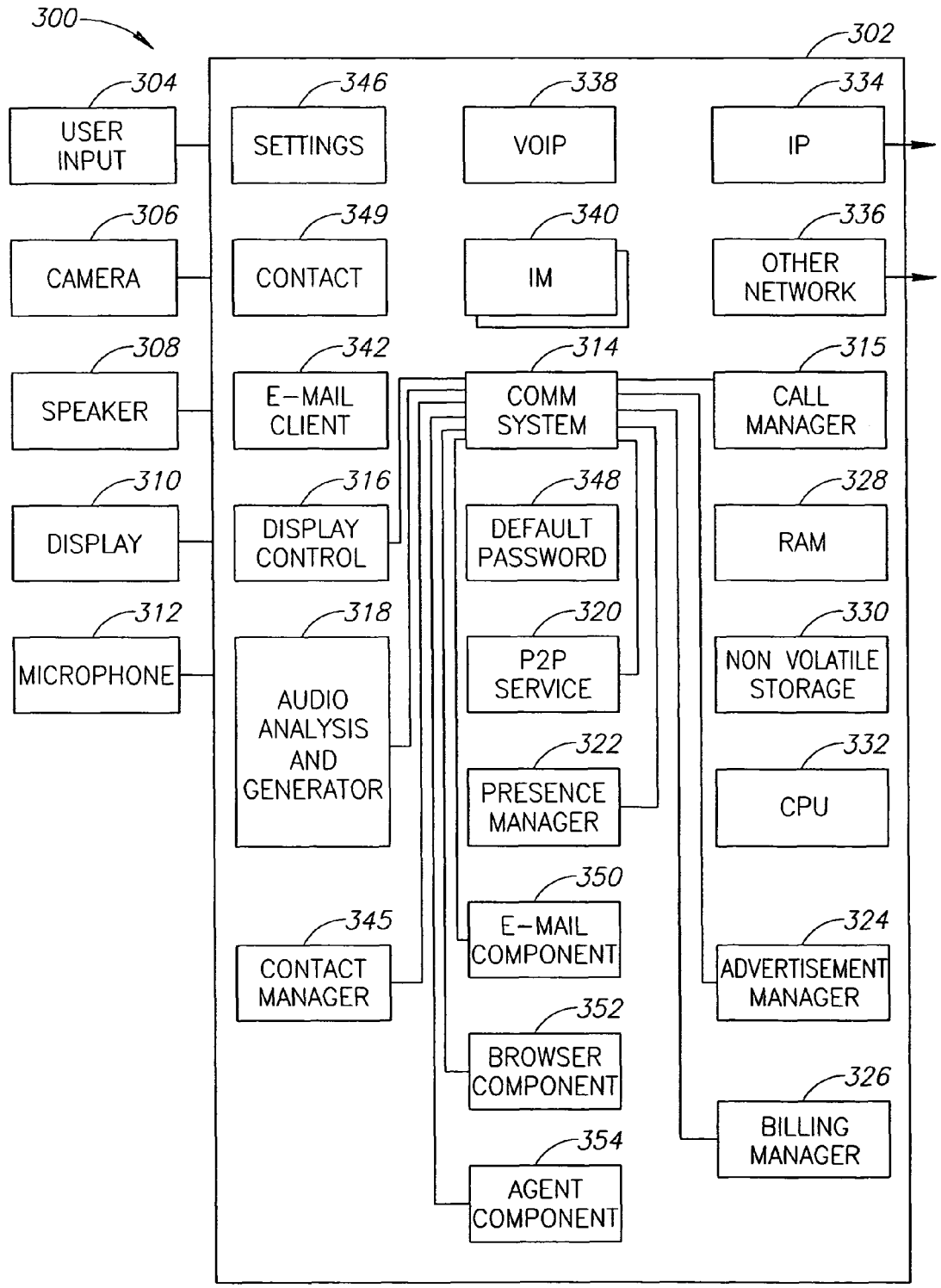
FIG. 3 is a schematic block diagram of an exemplary communication system client, in accordance with an exemplary embodiment of the invention.

FIG. 3 is a schematic block diagram of an exemplary communication system client 300, in accordance with an exemplary embodiment of the invention. Some or all of the software components (if any) of client 300 may be installed at 206 on first client 104. It should be noted that the description herein is a functional description of modules/units. In an actual implementation, it may be expected that some modules described as single entities are provided as a plurality of modules and/or that a plurality of modules are combined to act as a single logical entity.

In an exemplary embodiment of the invention, client 300 is a personal computer or a dedicated communication appliance, such as an advanced cellular telephone (other options described below); the description will focus on a personal computer example, in which a box 302 has attached to it various input/output elements. For example, box 302 may have connected to it a user input device 304, for example, a mouse, keyboard, touch screen, stylus and/or keypad. In an exemplary embodiment of the invention, input device 304 is used for selecting options, for example as described herein. A camera 306 is optionally provided for sending images and/or video. A speaker 308 and/or a microphone 312 are optionally provided for audio communication. It should be noted that in some embodiments of the invention, audio communication will be provided via a different venue, for example a telephone, with client 300 serving for coordination and/or providing advanced services such as video communication. A display 310 is optionally provided for user interface needs and/or for displaying images and/or video as part of communicating. Optionally, display 310 and/or speaker 308 are used to provide promotions and/or other advertising to the user.

A communication system software 314 is provided on box 302 and optionally includes a background process that monitors for incoming communication requests, such as calls and/or for requests for outgoing calls. Optionally, similar technology is provided as used in other communication clients, such as MSN messenger, Skype and/or Yahoo messenger. A call manager 315 is optionally provided to control setting up and replying to calls, including, optionally, hunting for a desired contact (described below). A display control module 316 is optionally included, for example for displaying avatars, as described below and/or for providing a user interface. An audio module 318 is optionally provided, for example, for generating sounds and/or analyzing sound inputs. An optional P2P (peer-to-peer) services module 320 provides peer-to-peer services when client 300 is part of a peer-to-peer network, in which databases and/or call setting up and/or media flow is a distributed act, rather than based on a central server. Various peer-to-peer systems, for example, for file exchange are known in the art and may be used as a basis for data exchange for communication methods as described herein. A presence manager 322 is optionally provided to determine and/or control the exhibition of a user's presence to other users. Optionally, this module provides answering functions when a user is not present and/or does not answer. An optional advertisement manager 324 controls the display of advertisements. A billing manager 326 optionally manages billing and/or crediting of the user of client 300. It should be noted that in some implementations, parts or whole modules will be provided as add-ons or as part of 3rd party software, including, for example, an operating system.

In an exemplary embodiment of the invention, box 302 includes standard computer components, such as a memory 328, non-volatile storage 330 and/or a CPU 332. In some embodiments, box 302 is not a computer but a dedicated communication device, for example, a smart-phone, a PDA, a cellular telephone, a set-top box, an e-mail device (e.g., blackberry) and/or an IP-phone. In some of these devices, the client is optionally provided as a firmware update.

In an exemplary embodiment of the invention, the communication service operates over an IP connection 334. Alternatively or additionally, an additional network connection 336 is provided, for example for a local network or a telephone line. For example, the client computer (or a server) may be connected to one or more local telephone lines (e.g., act as a PBX). Optionally, connection to a telephone company is via a service provider and/or a connection to a telephone company's ATM (asynchronous transfer mode) connection or other data transmission backbone.

In an exemplary embodiment of the invention, client 300 includes one or more other communication services installed, either previously installed or currently installed, for example, a VOIP client 338, an IM client 340 and/or additional clients. In an exemplary embodiment of the invention, and most commonly, an e-mail client 342 is installed on box 302. An example of an e-mail client is Outlook. One or more contact listings 349 are optionally provided on box 302 and may be shared by the various communication services, although they are not usually shared. Optionally, the communication service of the client shares or mirrors the contact list of another software, for example, Outlook, MSN messenger or Skype. Additional user settings and/or preferences 346 may be stored and/or replicated on box 302, for example, preferred background screen color, volume level and/or logic, blocked handles, addresses of bootstrap communication peers/servers/super nodes, personal callback messages and/or signature settings.

In an exemplary embodiment of the invention, the communication system includes a contact manager module 345 which tracks (and/or imports) contact use in client 300 and/or provides contact controls on a display.

In an exemplary embodiment of the invention, box 302 has stored thereon default login passwords 348 for various sites, for example, passwords for access to web-mail services (e.g., optionally stored as individual cookies). In an exemplary embodiment of the invention, for example as described below, these passwords allow for automatic import of contacts from that service into the communication system.

Exemplary Communication Server

Figure 4:
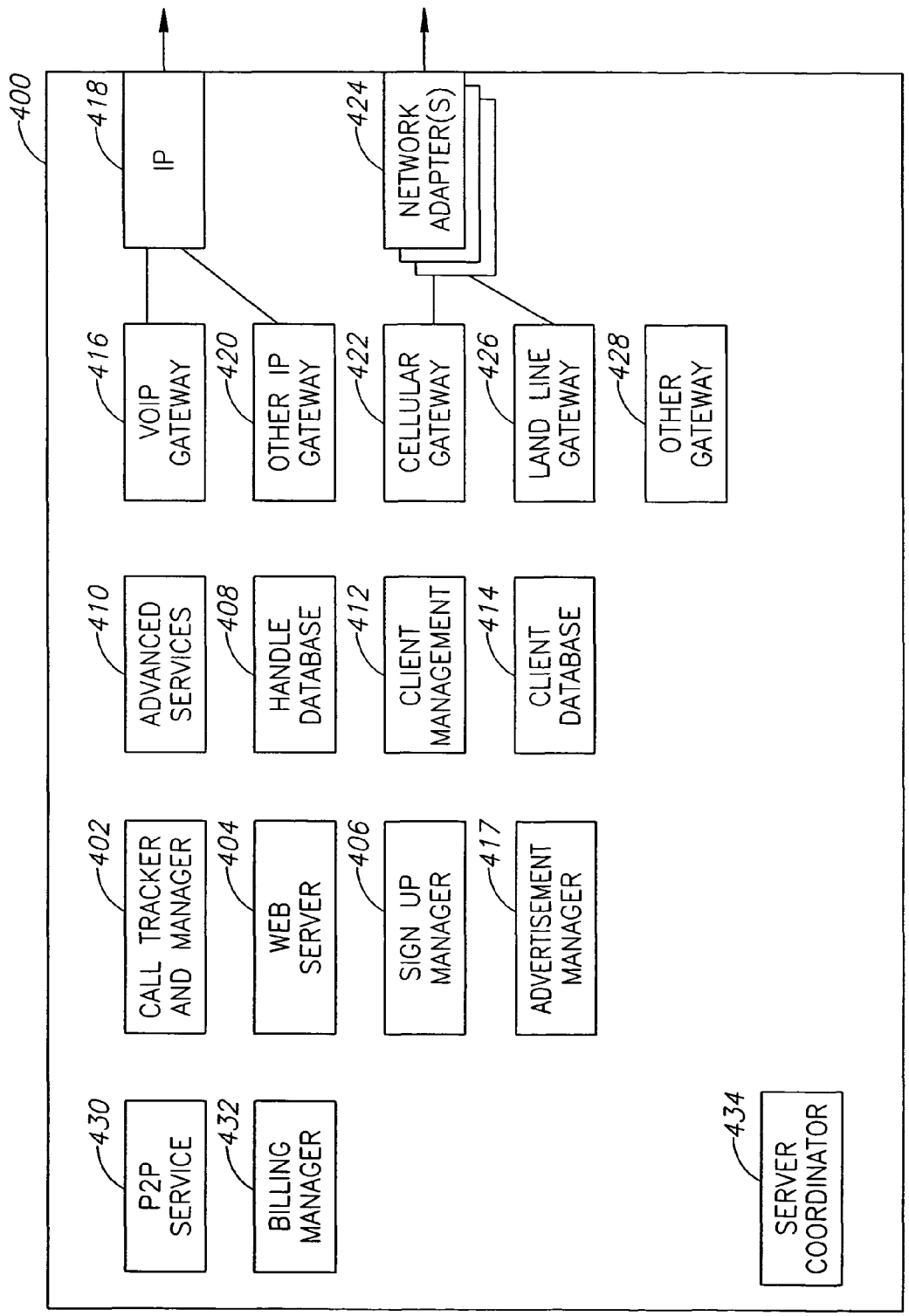
FIG. 4 is a schematic block diagram of a communication service server, in accordance with an exemplary embodiment of the invention.

FIG. 4 is a schematic block diagram of a communication service server 400, in accordance with an exemplary embodiment of the invention. In an exemplary embodiment of the invention, the functions described herein are divided up among multiple servers and/or clients that provided the functionalities.

A call tracking and management module 402 is optionally used to set up calls that require assistance (e.g., gateway access and multiple ring management) and/or handle call back and/or user hunt functions.

A web server 404 optionally hosts a web site of the communication service and/or supports downloading of client software. Optionally, web hosting is provided, for example using a single host or a distributed host (e.g., Akamai servers).

A sign-up manager 406 optionally handles signing up of new users/clients, as described below. In an exemplary embodiment of the invention, sign-up manager 406 handles personalized software generation, for example, to be able to support some custom e-mail clients, custom web sites (such as acme.salesforce.com or CRM.intranet.acme.com), custom IP phone and/or other special settings without the need to increase the distribution size of the generic release). Other exemplary personalizations include the user's handle and password.

When users sign up, a handle, for accessing the user is optionally stored in a handle database 408. Optionally, this database is distributed and/or mirrored between clients, for example using a mechanism such as used for DNS or by providing complete copies at each client. In an exemplary embodiment of the invention, any attempt to connect which a client is unable to complete, is handled by call tracking module 402 and handle database 408, for example by sending a sign-up/callback message to the handle. Alternatively, the client sends such messages, at least in some cases.

Optionally, advertisement presentation is managed by an advertisement manager 417.

Advanced services, such as conferencing, are optionally provided by an advanced services module 410. In some cases, the advanced services are provided by the client(s), e.g., in a distributed manner.

Users (human) and/or clients (software) of the system are optionally managed by a client management module 412, using a client database 414. In an exemplary embodiment of the invention, client management includes tracking client preferences and/or locations on client computers (or web services) where contact information is stored.

In an exemplary embodiment of the invention, the communication service works over an IP network, using an IP connector 418. Optionally, the communication service provides its own network and/or protocols for communication types (e.g., voice, IM). Alternatively or additionally, the communication service acts as a gateway for other IP based services, for example, including a VOIP gateway module 416. Separate modules may be provided for separate VOIP services. In an exemplary embodiment of the invention, the gateway can emulate a VOIP client to the VOIP service, even if the communication service uses a VOIP protocol, for example, to avoid the need to register the user with the VOIP service. In another example, client 300 executes a client agent of the communication service (e.g., VOIP) to which a user wants to connect, rather than the service provided by client 300, as described herein. In another example, a server may include an API for a service (such as Skype) and use the API to connect to users in the service (e.g., Skype) network. In an exemplary embodiment of the invention, client 300 can directly communicate with other clients that are supported, such as IM or VOIP, either directly or using another client computer as an intermediary.

One or more additional gateways 420 for other IP services, such as instant messenger, are optionally provided.

Gateways (e.g., a gateway 428) to non-IP services are optionally provided as well. As noted below, such gateways may be distributed geographically. In an exemplary embodiment of the invention, a cellular gateway 422 is provided for voice, data and/or video communications with a cellular system, for example, using a suitable network adapter 424 (there may be several). Another particular type of gateway is a landline gateway 426. In an exemplary embodiment of the invention, the landline gateway is used to set up calls with landlines. Optionally, the gateway also coordinates composite calls, where, for example, video is via an IP network and voice is via a landline. In an exemplary embodiment of the invention, as described below, some or all landline calls are made without cost to a user. In an exemplary embodiment of the invention, landline gateway 426 is used as an IVR (interactive voice response) interface for setting up landline users.

In an exemplary embodiment of the invention, an IVR system is used to call to any handle, by a user dialing a telephone number and in response to an IVR menu (or without any menu) enter a handle to which the user wishes to be connected. Methods of text entry using telephones are well known in the art. In an exemplary embodiment of the invention, a user can register without a web connection, by calling up an IVR system and asking to be connected. User authentication is optionally via a caller ID function. Optionally, an e-mail handle is generated automatically, for example "1234@comser.com", where "1234" is the user's telephone number (handle) and "comser.com" is a domain hosted/owned by the communication service. Optionally, incoming text messages are read out using a text-to-speech service.

In an exemplary embodiment of the invention, when a user calls up a telephone number and leaves a message, replying to the message can be used to connect back to the user. For example, using caller ID (of the telephone number), server 400 can determine which user called up and connect the call. Optionally, the server has several lines and uses the identification of the line called back on to associate the callback with a particular call attempt. Alternatively or additionally, when a user calls back, the communication server uses an IVR system to set up the user, as described above, for example.

Optionally, server 400 includes a peer-to-peer services module 430, for supporting/managing a peer-to-peer network, if one is used for the communication service and/or to allow the server to act as part of the network. In some cases, client computers, for example, enterprise installations, will provide a server for local use (e.g., in the enterprise) and/or act as super-nodes for other clients. Optionally, a user is reimbursed for such support, for example, by lower cost calls and/or advanced services.

A billing management module 432 is optionally provided for charging users for usage of the communication system and/or coordinating payment. Optionally, a plurality of user accounts is maintained, each with one or more balances (e.g., balance of prepaid, balance of new calls and/or balance of promotions).

In an exemplary embodiment of the invention, server 400 is implemented as a single or a cluster of server computers, for example, using a blade architecture. It should be noted that in an exemplary embodiment of the invention, the communication system operates without a server, however, some services, for example, downloading of a client software are optionally provided in a centralized manner. A server or servers may provide one or more of the services described above with respect to modules. It should be noted that in a practical implement, the software/hardware modules used may not be delineated in the same manner as described herein. In an exemplary embodiment of the invention, a server coordination module 434 is provided to ensure coordination between multiple servers optionally extant in the communication systems.

The following types of services may be identified, and one or more of (or part of) are optionally provided as part of server 400 (or the client, in some embodiments):

(a) services related to establishing communication within a communication system;

(b) services relating to linkage with outside systems;

(c) services beyond basic communication (e.g., conferencing);

(d) support of the communication system (e.g., software updates);

(e) client interface and revenue generation; and/or (f) encryption, authentication and/or certification.

Some of these services, for example, connection to landlines, may naturally be provided at a plurality of geographically distributed servers, so as to be in localities where prices are lower.

Some of these services, for example, provision of client software may be hosted by any hosting service.

Some of the services, for example, peer-to-peer network management functions may be distributed among clients, for example, with some clients acting as "super-nodes".

Exemplary Call Making Process

Figure 5A:
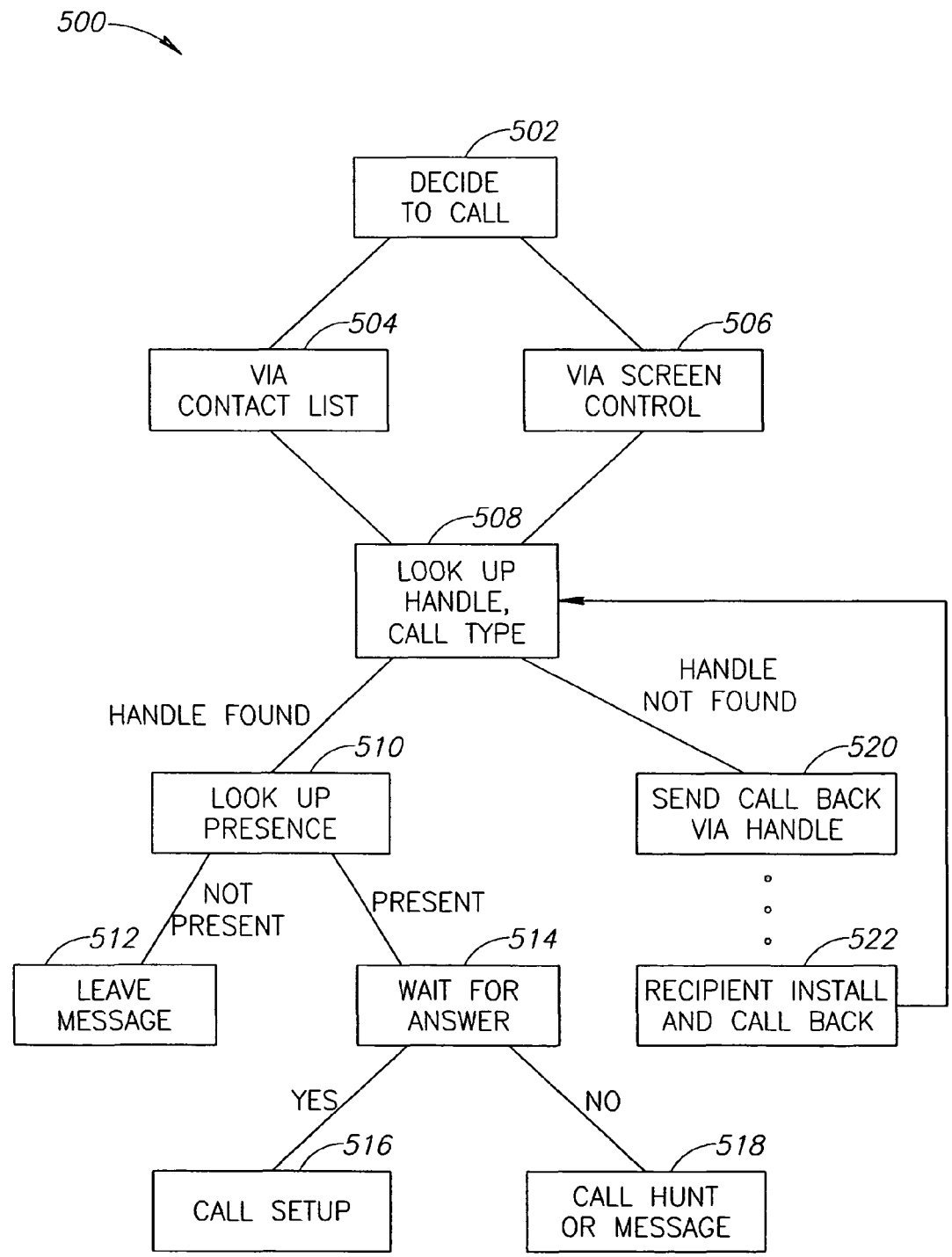
FIG. 5A is a flowchart of a process of making a call, in accordance with an exemplary embodiment of the invention.

FIG. 5A is a flowchart of a process 500 of making a call, in accordance with an exemplary embodiment of the invention. In an exemplary embodiment of the invention, the call is a real-time communication between a person and another person or a person and an interactive program, including, for example, immediate messaging (IM), voice and/or video calls. In an exemplary embodiment of the invention, real-time communication calls have the property that both sides are in contact and can be aware of the contact at all times. Possibly, in real time communication calls, data sent by a user is delivered to a recipient within less than a second, less than 0.5 seconds or even less than 0.25 seconds.

At 502, a user decides to make a call. In some embodiments of the invention, the user supplies an indication of the media type of the call, for example, voice, video or text, a protocol to be used for the call (e.g., IM or VOIP) and/or a handle which identifies the party with which the call is initiated. Possibly, the handle is in a different protocol from that selected for the transmission. Optionally, client 300 includes multiple methods of making a call and/or providing one or more of the pieces of information required to carry out the call, including, for example, by selecting from a contact list (504) or by clicking on a screen button (506, button adding described below). Additional methods, include, for example, voice activated and automatic based on a scheduled call/conference. In cases where user instructions are not clear or automatic, a user may be asked to confirm the call set-up. Optionally, a default calling method is selected, for example, based on cost, based on availability, based on user preferences and/or based on previous type of call made.

Optionally, when the system has the option of selecting a communication method, the decision may be based on profit margin and/or other incentives of the service provider (e.g., as provided by 3rd parties), rather than those of the client. In some cases, such incentives are transparent to the client.

As to selecting the media, optionally, the various media are arranged in an order of preference, possibly per user and/or contact. Alternatively or additionally, various possible connection protocols are provided and arranged in an order. Optionally, a default call type and/or protocol (e.g., IM or VOIP) are provided.

At 508, an attempt to translate the contact handle into a specific handle for the call type selected, is made. This attempt may be by the client 106 and/or server 108, depending on the implementation. In an exemplary embodiment of the invention, client 300 and/or server 400 guess which communication system the handle may be used on. Optionally, the handle (e.g., e-mail) is used also as a handle by the communication system. However, many communication systems have well-defined handle formats, for example, e-mail and landlines. In an exemplary embodiment of the invention, a pattern matching method and/or a pre-configured script or sets of scripts or patterns are used to identify the service indicated by the handle. Alternatively or additionally, user may indicate the service provider. Optionally, if it cannot be determined, a user selected between services and/or completion options of the entered handle. Optionally, if the handle matches contact information or a previously successful call, it is assumed that that handle is for the same communication system used for that successful call (e.g., assuming that it is not a handle for the communication system of server 400).

It should be noted that various levels of automaticity may be provided. For example, in a mostly automatic version of the system, a user provides minimal information, for example a handle. In a more manual version, user may provide a handle, service provider, media type and select a response to carry out if there is no answer.

At 510, a specific handle for communication (e.g., of the communication system or of another communication system) is found and a determination is optionally made whether the contact is nominally present or not. It should be noted that a user may indicate himself as being not present for all or some or particular callers and/or calling methods, even if he is actually present. A user may also "answer" an incoming call by a "non-available" option selection, for example, if such an option is presented on a screen dialog box that notifies the user of the incoming call.

If the contact is not present, a message is optionally left (512). Optionally, pre-configurations and/or defaults are used to define if a message is left for the recipient and the media (e.g., voice or e-mail) in which the message will be left.

If the contact is nominally present, several rings may pass before the contact answers (514). Optionally, the waiting time and/or ring number is pre-configured. If the contact answers, a call is set up (516). If the contact does not answer, a call hunt (described below) may be carried out, or a message left (518). Optionally, a call scanning function is used, where an attempt to call is made repeatedly. Optionally, once the recipient is reached, the call initiator is notified. Possibly, calls are made only if the local client determines that the call initiator is present. Optionally, the call scanning function is started automatically or by user request. Optionally, if an e-mail message is left, additional e-mail messages are optionally not left.

Referring back to 508, if a specific handle of the communication service used is not found, the contact handle is optionally used to send a call back message (520). This message optionally includes a click-to-install button and/or link (e.g., active or provided as text) for setting up the communication service, or a click-to-call back, if a suitable communication service is installed on the contact's machine. In an exemplary embodiment of the invention, only a single type of link is used both for "call back" messages and for "join and call back" messages (e.g., for both 512 and 520). In an exemplary embodiment of the invention, a unique call-back ID is provided for such messages and may be used, for example, for validation and/or for preventing multiple call backs to a same original call attempt. Optionally, the client can generate its own unique IDs, when sending out requests to callback. Optionally, the unique ID is registered with the server or stays in the client and is used by the client for validating a callback (e.g., the callback includes the unique ID). Optionally, when a callback is made and there are multiple types of calls that can be setup with the initiator, the type is manually selected. Optionally, the type may be automatically selected and/or suggested, for example, based on last call that worked or based on cost to place the call. The cost may be a cost to the system, rather than cost to the user.

After a time (522), a user will generally activate the click-to-install button and following the process of FIG. 2, ultimately generate a call back to the initiator of process 500. This call back may fail, for example, if the initiator is not present any more.

Exemplary Joining Methods and Setup Processes

Referring back to FIG. 2, and especially to acts 202, 204 and 206, there are several exemplary methods by which a user may join the communication services of the communication system. It is noted that some services of the system do not require a user to join. Instead, a call initiator may pass through a gateway provided by the communication system.

It is a particular feature of some embodiments of the invention that joining requires a minimum of user participation and/or input.

Figure 5B:
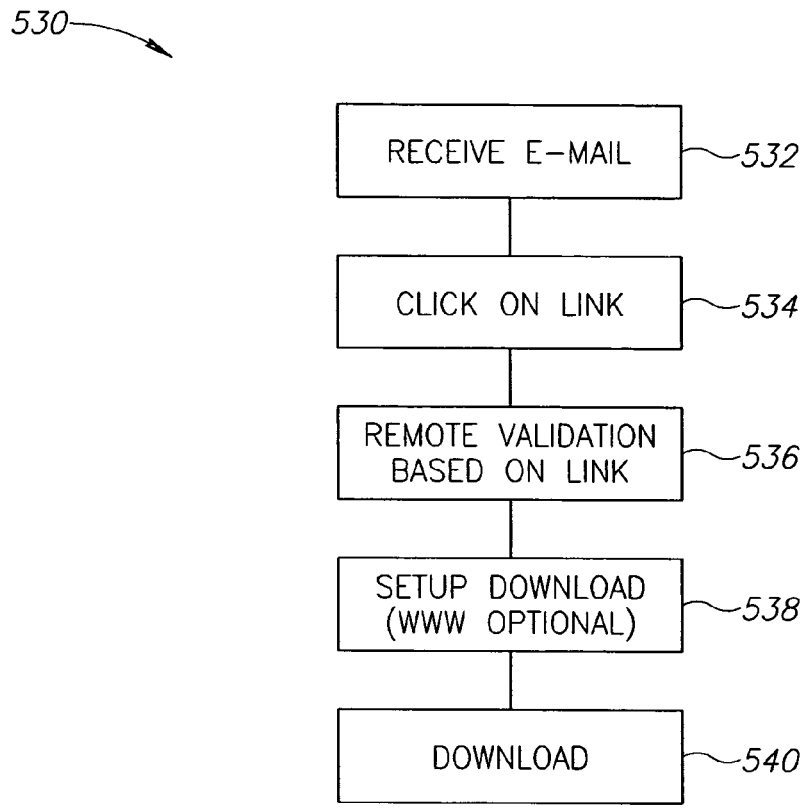
FIG. 5B is a flowchart illustrating a method of joining a communication service, via e-mail request to call back, in accordance with an exemplary embodiment of the invention.

FIG. 5B is a flowchart illustrating a method 530 of joining a communication service, via an e-mail initiated process, in accordance with an exemplary embodiment of the invention. At 532, a user is requested to call back (e.g., including joining) when an attempt to contact him fails for lack of the user supporting a desired communication protocol. In an exemplary embodiment of the invention, the handle used to (attempt to) call the user is an e-mail address of the user. In the message left for the user, there is a link, that when clicked on (534) downloads the client software. In an exemplary embodiment of the invention, a record already exists in the server that this e-mail handle is going to register, and clicking is used for validation (that the clicker has access to the joining e-mail) and for completing the registration. As described below, the click may also generate a password to be used in logging in to the system and thus availability of the communication service. Optionally, the user is validated from within the e-mail client (536) to ensure that it is the recipient of the e-mail that is joining. Optionally, the validation comprises determining that the user has access to the "callback" e-mail, by comparing a unique ID of the e-mail (e.g., in the link) and the record made of the expected registration.

Optionally, the clicking opens a web page for download of client software (or optionally includes a self-executing script that attempts to install an ActiveX object), however, direct download is possible as well. At 538, the software is optionally prepared for download. Optionally, the software is prepared for the client, ahead of time, for example, when the attempt to access the user is made. Alternatively or additionally to preparing the software at that time, a note is made in an internal (e.g., internal to the server) database, that that user is being requested to join. Optionally, a request can go stale after a while. In an exemplary embodiment of the invention, the software is pre-programmed with the user handle, password and/or a handle to call back. Optionally, the pre-programming comprises storage as a cookie in the downloaded software, (e.g., ActiveX) requests that the information be stored in a "preferences" location, such as a file or a registry. Alternatively, any other method of software provision which does not require entering a web site, is used. Once downloaded (540), a process described below is followed.

In an exemplary embodiment of the invention, the user is registered even if he does not actually install the software on any computer, for example, by means of a recording of the user handle at a server. The user may now be considered available, but offline.

In some cases, the e-mail request is not a specific invitation to join or a callback message, but rather a link that is attached to outgoing communications of a communication system user and which invites other users to call back (e.g., as a signature portion of e-mails). This link may be dedicated to the recipient or may generally access the web site or otherwise download unpersonalized software.

Figure 5C:
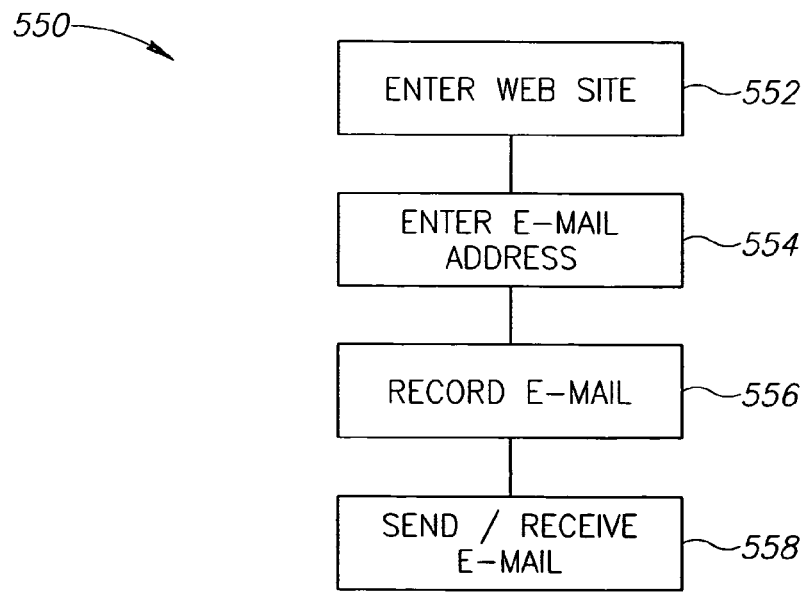
FIG. 5C is a flowchart illustrating a method of joining a communication service, using a web site, in accordance with an exemplary embodiment of the invention.

FIG. 5C is a flowchart illustrating a method 550 of joining a communication service, via a web site, in accordance with an exemplary embodiment of the invention.

In an exemplary embodiment of the invention, the process includes a user accessing a web site associated with the communication service and enters his handle of an existing communication service, for example, an e-mail address, on the webpage. If the entered handle can receive messages with links in them (such as an e-mail address handle that can receive e-mails, or other communication methods that can receive messages with links), an e-mail/message with a link to "Join"/"Download"/"Activate" will be received in the handle (e-mail inbox in the case of using an e-mail address as a handle). The clicked link can initiate the "join and download" process described above.

At 552, a user goes to a web site associated with the communication service and requests and/or downloads the client software. Optionally, the software is self executing and/or self-registering, so the control used for downloading can read "join", rather than "download". In an exemplary embodiment of the invention, the user enters his handle, e.g., e-mail address (554), on the web page. Optionally, this handle is used for personalizing software for download (e.g., 538, FIG. 5B). Optionally, a user is requested to identify himself as human, for example, using a visual perception task as known in the art.

In some embodiments of the invention, the handle is not recorded. Optionally, however, the handle is recorded (556), for example, to track later installation and usage of the software and/or for validation.

In an exemplary embodiment of the invention, a registration process (described below) starts when the user enters his handle. The registration may be completed at this stage (with the user possibly only becoming active if he installs software), or may require a completion of the process by a user receiving an e-mail to his mailbox using the handle (and thus optionally providing validation).

Optionally, the software is provided by e-mail to the user, for example, using the entered handle (558). Optionally, a link to download the software is provided instead of software. The process continues as described in FIG. 5B.

It should be noted that the site of act 552, need not be a WWW site. For example, the handle can be a cellular telephone number and a link to a cellular provider and/or a WAP location (or a web site) is provided by SMS to the cellular telephone. Optionally, a caller ID function of the cellular telephone is used to validate the user/handle.

In an exemplary embodiment of the invention, a sign up process will be caused automatically by the client, which will request the server to generate a new active account (with a generated password) every time the software detects a new e-mail address that is used by the user of the PC.

In a third joining method, the user is not required to provide his e-mail or other handle at the web site. Instead, the client software, once executed on the user's computer, figures out the user's e-mail, for example, based on outlook settings, or requests a handle from the user. Optionally, server 400 sends a confirmation e-mail to the user to ensure correct setting up. Optionally, if the client software does not receive the e-mail within a preset time period, the installation is deactivated. In an exemplary embodiment of the invention, the server includes in the e-mail a button that when clicked informs the installed client software that the e-mail was sent from the server to close the registration/validation loop.

In an exemplary embodiment of the invention, a user can login from multiple locations. In an exemplary embodiment of the invention, each time a user runs a client on a target computer (e.g., when in a webmail site) a new client is set-up, optionally, with a new password. Optionally, this is used to allow a user to roam between computers. Optionally, the server and/or other parts of the communication system keep track of multiple physical locations and/or passwords for a user.

Figure 6:
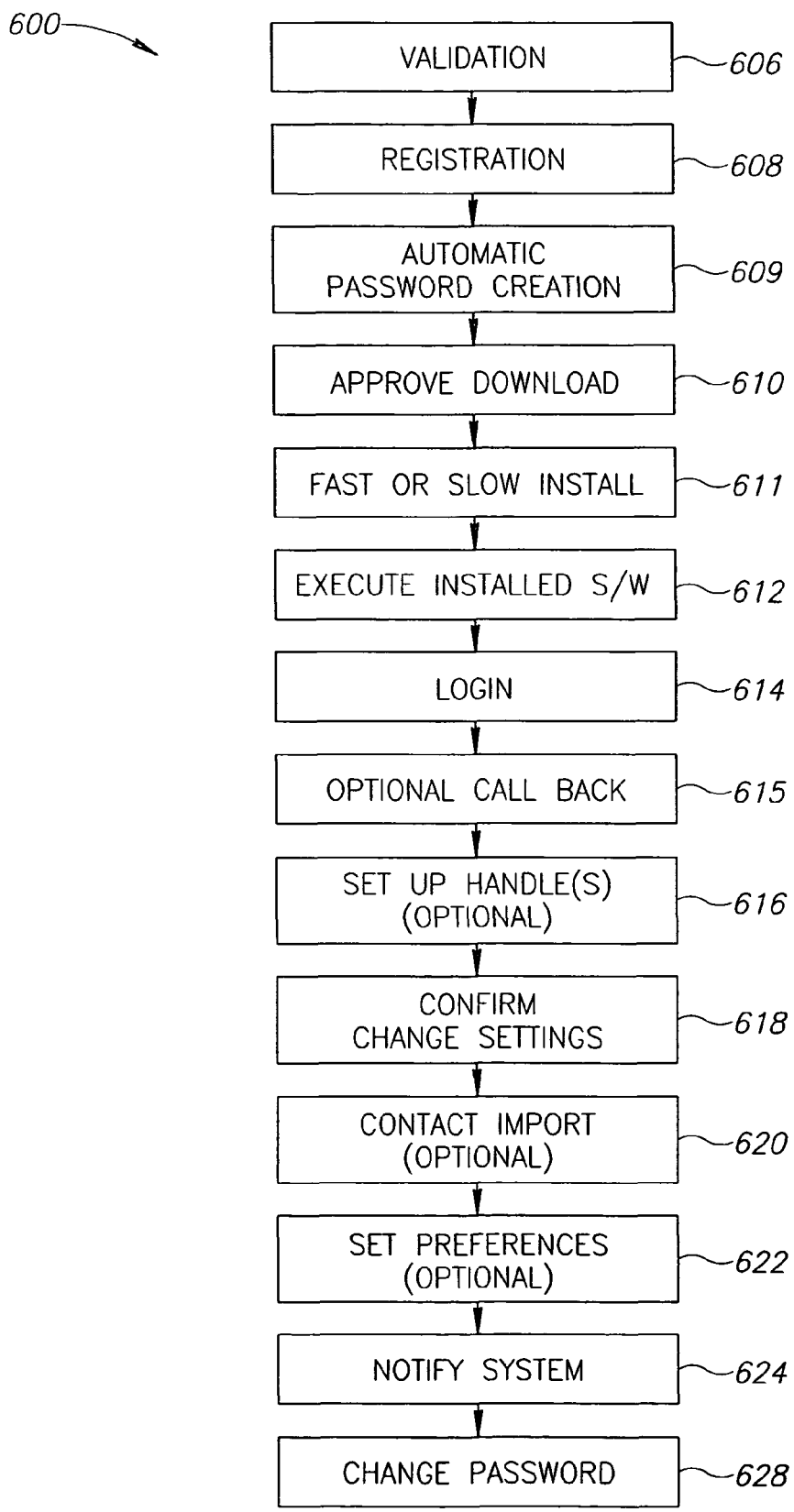
FIG. 6 is a flowchart of a process of client setup and registration, in accordance with an exemplary embodiment of the invention.

FIG. 6 is a flowchart of a process 600 of client registration and setup (including processes carried out at a first use of the client), in accordance with an exemplary embodiment of the invention. This relates generally to acts 206-210 of FIG. 2. It should be noted that there are multiple possible implementations, such that various acts may be performed out of the order shown herewith or at a different time (e.g., as part of regular use, rather than start up). Some of the described acts may be carried out reputably or after a time, for example, during regular use, for example contact importation.

In an exemplary embodiment of the invention, validation, registration and/or password creation are carried out at 536 (FIG. 5), even before any software is downloaded, for example, as described above.

At 606, the user is validated. In an exemplary embodiment of the invention, the validation happens when the link/control to download/callback is clicked on. The click on the link from within the e-mail (or other message handling device if the handle is not an e-mail address) gives an indication to the communication service database, that the handle has joined the communication service. In another method, validation is on the client computer by the software checking that the computer on which it is being installed actually uses the handle to send and receive messages.

In some embodiments of the invention, the software is downloaded directly to the user computer, without going through e-mail. Optionally, an alternative validation method, if any, is used, to ensure the user is actually the owner of the handle. In addition, in some cases, it may be desirable to validate a user at later times, for example, if no password is used for logging in.

In one example, a network passport (e.g., Microsoft passport) is used to validate the handle. Validation may also be an issue during usage of the client, after the initial installation.

In another example of a validation method, if a user is signed onto a web-mail provider, such as gmail, this is detected by an add-on installed in the browser, or by the browser itself.

In another example, an installed client can detect the configuration of a local e-mail client (such as outlook), and determine if the configuration is operable and matches the e-mail provided.

In an exemplary embodiment of the invention, when a user initiates a call-back from a given software, the client software determines the e-mail address used to display the message. Similarly, if a callback is initiated from a calendar or contacts view, the client can use the default e-mail account for communication.

In an exemplary embodiment of the invention, other validation methods are used when not initiating a call from within an e-mail client or webmail account.

In an exemplary embodiment of the invention, once properly logged in (e.g., using Outlook), the client may be used from any software. Optionally, such allowance continues, for example, until the user logs out of the webmail account and/or for a period of time after. This may be useful for connecting from an internet café, where the user of a computer may change several times a day and privacy is an issue.

At 608, the client is registered. In an exemplary embodiment of the invention, registration includes associating the handle with a SIP (or other protocol-specific handle) and setting up client records at the server. Optionally, the user can enter identifying information at this point. However, it is a particular feature of some embodiments of the invention, that validation, registration, password creation and login occur without user intervention.

At 609, a user password is optionally created, for controlling access of users to the system.

At 610, a user is typically required (by security systems) to approve download and/or installation.

At 611, a user installs the software, for example, using a fast installation method (such as Active-X) or a slower installation method (such as regular installation). During installation, a user may be required to accept a EULA (end user license agreement) and/or accept terms of service. Alternatively terms of service may be set prior to downloading the software (e.g., at the web site) or during a later configuration session.

At 612, the client software is executed. While, technically, software may have been executed earlier, at this point the client may be notified that installation is complete and/or be in interaction with the software (rather than only with the installation process—e.g., accepting a EULA and setting storage location for the software). In an exemplary embodiment of the invention, execution of the client and/or installation included setting up of various DLLs and/or background processes.

At 614, the client software is logged into the communication system (if required). It is noted that this logging in optionally occurs without the user being aware of the password. In an exemplary embodiment of the invention, downloading is using ActiveX, and the ActiveX object stores relevant information (e.g., handle, password, callback address) in a preferences location such as a file or registry. If a non-ActiveX download method was used, this data is optionally stored in a cookie and accessed by finding the latest cookie from the communication server. In some embodiments, a password is provided to a user separately, for example, by e-mail. Optionally, the password provided determines what usage options a user has, for example, advanced services and connections to other communication systems. In an exemplary embodiment of the invention, a user can operate for a given amount of time without a password, for example for a current session, a few minutes or a few days. In an exemplary embodiment of the invention, however, the password is automatically generated, so a password is always available.

At 615, if an invitation to join/callback was part of a communication attempt, the address to return to, was optionally stored in a registry entry and at this stage extracted from the registry and a call returned thereto. In an exemplary embodiment of the invention, tracking of user incoming calls can happen before the user is ever logged in. Optionally, a user can see a list of all incoming call attempts and decide which one to answer first. Such a list may be useful also after the first installation of the client.

At 616, a user optionally sets up one or more handles. In one example, a user may have multiple handles (e.g., e-mail addresses) he uses for outside communication, but wishes all incoming communication to arrive to a same handle. A user can set up a single handle to be a "lead" handle. Optionally, the first handle for a user is a "lead" handle. The use of previous handles is optionally detected during installation by noting the client software is already installed and a local handle registered. In an exemplary embodiment of the invention, a user can define sources for calls which are automatically diverted to non-lead handles. In one example, a user can designate a business handle and a personal handle. Diversion optionally depends on the time of day, instead of or in addition to the identification of the caller. The handle used for calling out may also depend on the outlook account on which the user received the message, and also by using the default outlook account, if outlook is installed, or the last address used, if outlook is not installed.

In an exemplary embodiment of the invention, multiple e-mail accounts of a single user are merged in various manners.

In one example, when a user asks to add a new e-mail to an existing handle, an e-mail is sent to the new e-mail for the user to confirm that he wants the e-mails to join. Optionally, a standard e-mail format is used and when the user reaches the system web server, the page displayed is a confirmation of joining, rather than an offer to download software. Optionally, a menu items is provided in the interface of client 300 (or in the e-mail client) to perform this task. Optionally, the interface of client 300 is a web page on which various controls are added by the client, for example, as described below. In an exemplary embodiment of the invention, when a user uses a new e-mail address on the computer, client 300 detects this and asks the user if to merge it with an existing handle, and stores the result in a user preferences file.

In another example, all accounts on a same e-mail client and/or accessed by a same computer (e.g., webmail) are merged automatically, optionally with user approval.

In an exemplary embodiment of the invention, when a user has multiple e-mails for a single account, a user can optionally select, at sign-on or at a later time, which e-mails to join in to the handle and which not. Optionally, one or more handles are marked as "unavailable". It should be noted that marking an e-mail as unavailable does not necessarily log-off from the server and need not trigger a new password generation (e.g., a manual request or an automatic generation of a password).

In an exemplary embodiment of the invention, a user has the option of unmerging an e-mail account from the main handle account. Optionally, this causes the sending of a validation e-mail to the account being unmerged.

Optionally, a user can associate protocol-specific handles other than a SIP handle, for example, an existing SIP handle or an IM handle. In some cases, the user has no fixed IP. Optionally, the user selects a dynamic IP tracker service which records changes in the user's IP and provides a mapping service between a handle (e.g., SIP, IP) and the user's IP. Optionally, server 400 provides this service, using a reporter module located in client 300. In an exemplary embodiment of the invention, every time the client logs in it provides its current IP. It should be noted that multiple IPs for a single user may be active at a same time. Also a single client computer may have multiple IPs.

At 618, a user optionally confirms and/or changes usage settings, for example, whether to include a callback link in e-mail signature sections. In an exemplary embodiment of the invention, when a registered user clicks on such a link, the server (on which the link is hosted) notified the client to make the call back. In an alternative embodiment, the client identifies and handles the link.

At 620, contacts are optionally imported and/or settings for later importations set (see FIG. 7, below). Alternatively or additionally, a user may enter contacts.

At 622, a user optionally sets preferences, for example, regarding adding links to display addresses (FIG. 8), information to display when calling in to another user, number of rings to wait before leaving a message, whether or not to add callback links to outgoing e-mail messages and/or privacy settings. Optionally, at least some of the preferences relate to contacts imported into the system.

At 624, the server is optionally notified of all the settings. In some cases, the settings are propagated to other clients. It should be appreciated that the order of the above steps can be changed.

If a user wants to change his password (628), he can do so at act 616 or act 622. Optionally, however, passwords are changed when the client logs out/signs out. In an exemplary embodiment of the invention, a password changing dialog is present to a user when he logs the client out of the communication system. In an exemplary embodiment of the invention, a user avoids any management of the password, for example, if the e-mail login is used for validating the client and permission for a user to access the communication server for a handle follows from the user having access to software/webmail using the handle.

In an exemplary embodiment of the invention, a new password is automatically generated periodically by the client, for example, for security reasons. Optionally, a new password is generated each sign-off.

Contact Importation

Figure 7:
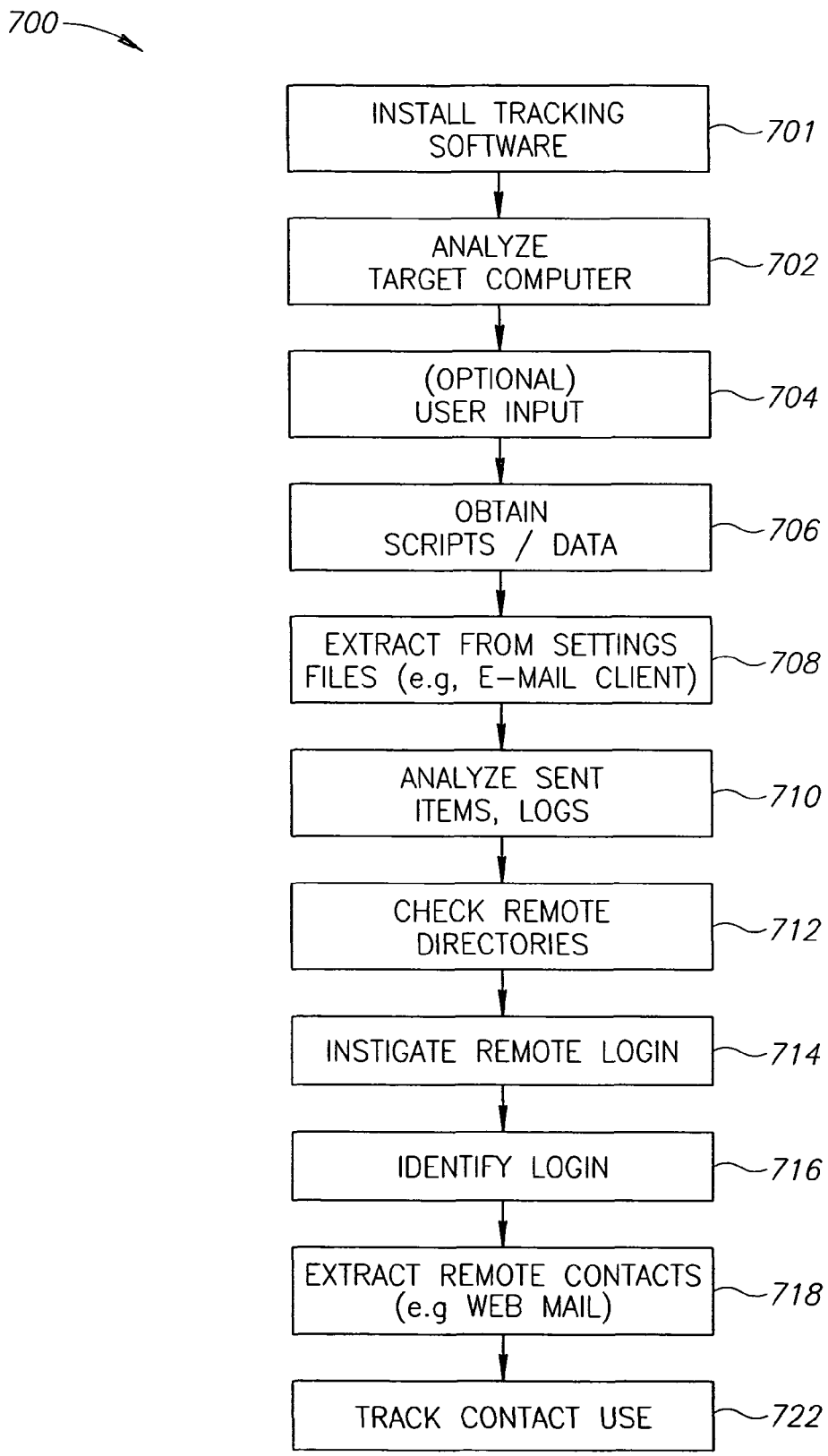
FIG. 7 is a flowchart of a method of contact import, in accordance with an exemplary embodiment of the invention.
Figure 8:
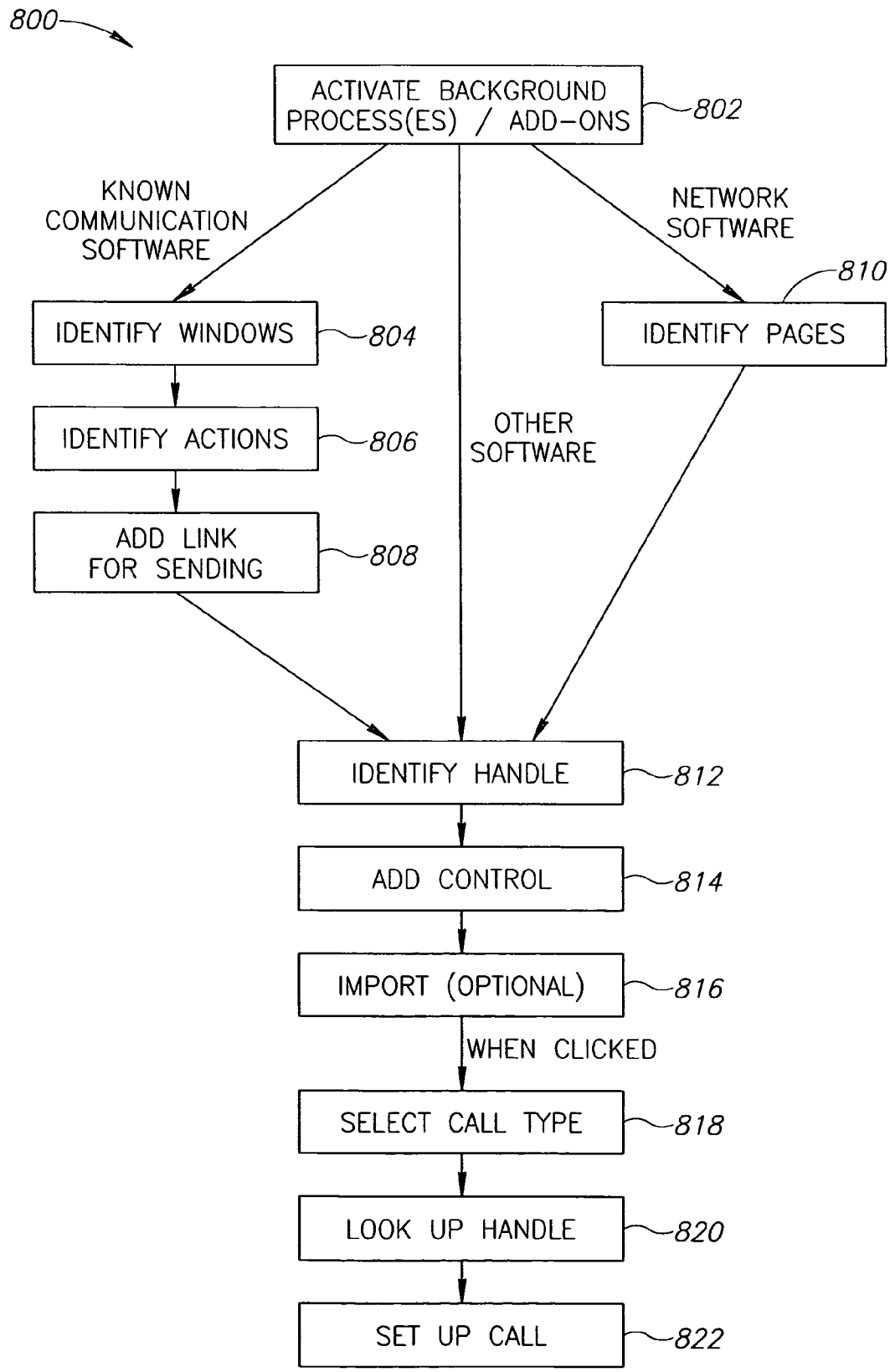
FIG. 8 is a flowchart of a method of adding contact controls on a screen, in accordance with an exemplary embodiment of the invention.

FIG. 7 is a flowchart of a method 700 of contact importation, in accordance with an exemplary embodiment of the invention. In general, contact importation includes three distinct processes, each of which is optionally activated by a user and/or uses a background process or application plug-in (FIG. 8 and components 350, 352 and 354, FIG. 3).

A first process may extract contacts stored on client 300—whether they are stored in an e-mail application (for example Outlook) or locally on the exemplary client. This may use an e-mail client component (350, FIG. 3).

A second process may extract contacts stored at remote locations. This includes webmail accounts accessed via a browser. Optionally, a browser component (352, FIG. 3) will extract the contact information from webmail accounts and/or webpages. For example if a Hotmail user is logged into a Hotmail account or the user allows access to the account, the Hotmail contacts and/or communication handles that the user is communicating with (sent items for example) will be automatically imported.

A third process may extract contact information from remote and local locations such as $3^{rd}$ party directories and address books. Optionally, an agent component (354, FIG. 3) will identify those sources and retrieve the relevant information from them. In an exemplary embodiment of the invention, the importation is from clients and/or software that support a communication service of a different type than used in the communication system.

Alternatively or additionally, to the methods described herein for importing contacts, any methods of contact importation known in the art may be used.

These processes may be used both for initial importation and for subsequent importation, for example, to track changes in contacts. The processes may be used together or may each be used separately, for example, according to user selection.

In an exemplary embodiment of the invention, the handle used for contacting the user is used as the handle in the above processes to call the contact and attempt to set up a communication with him. In an exemplary embodiment of the invention, contacts are imported from at least 2, at least 3, or even at least 4 services. Optionally, the contacts are imported for at least 2 at least 3 at least 4 types of media and/or protocols.

At 701, contact usage software is optionally installed. In an exemplary embodiment of the invention, such software is installed as a browser plug in or on a TCP/IP stack or in a location in the operating system of client 300 where it can hook onto HTTP requests and/or POP3 requests (and/or intercept messages for other relevant protocols) and identifies access to a list of locations known to be communication related. Optionally, this contact usage software is disabled during initial importation and/or setup.

At 702, the target computer (e.g., box 302, FIG. 3) is analyzed to determine what communication services are currently supported. In an exemplary embodiment of the invention, the analysis comprises of one or more of, analyzing a registry of the computer, analyzing processes and/or applications/programs that are installed or running on box 302, analyzing cookies, analyzing WWW browsing history, analyzing the format of a handle "activated" on client 300 (e.g., if the handle is anyname@hotmail.com, then hotmail is assumed to be a relevant contact source). Analysis is carried out by the client and/or by the installation process.

At 704, user input is optionally provided. Such input may include, for example, selecting which type of contacts to import, identification of services to import contacts from and instructions for dealing with multiple local handles. In one example, a computer may include an e-mail client used for multiple handles, for example, for a family. In this case a user may desire (or not) that only some contacts be imported, for example, those that relate to general use or those that relate to personal use. Optionally, a user can select a specific outlook folder (for example) to import contacts from.

When importing contacts (and/or other settings) from a communication service, particular scripts and/or data (e.g., identification of WWW sites of interest) may be used for identifying the service and/or extraction therefrom. In an exemplary embodiment of the invention, some such scripts or other types of configuration files, for example, locations to examine in web pages, are provided with the client. Others, however, may be downloaded (706) from the server, as needed. Alternatively or additionally, the client software is generated for download and/or installed based on the determined needs for contact importation and/or control adding (FIG. 8).

At 708, contacts and/or settings are extracted from local files, for example from contact lists. Optionally, mail server files, such as Microsoft Exchange files are read as well. In an exemplary embodiment of the invention, the contacts are read using an e-mail client add-on, which can access contacts in a same manner as the e-mail client. Exemplary e-mail clients include Outlook and Lotus notes. Optionally, changes in contact information are identified by an installed agent and used to update the contacts list of client 300. Optionally, client 300 mirrors or links to the Outlook contacts, rather than importing them.

At 710, data is optionally extracted from "sent" items and/or from log files. In an exemplary embodiment of the invention, such analysis is used to identify other handles used on the target computer. For example, if an Outlook client is determined to have multiple accounts, all such accounts can be automatically or semi-automatically associated with a single handle in the communication system.

At 712, data is optionally extracted from a network contact list and/or service, for example LDAP or other 3rd party directory services. Optionally, the contacts are maintained in a hierarchy.

Optionally, the contacts that are imported, from other sources, are marked as to source. Optionally, a step (not shown) of arranging and/or consolidating the contacts is performed, for example, consolidation by full name. Optionally, for example for a hunt feature as described below, all the various handles for each contact are maintained.

At 714, login to remote services (e.g., web-based mail) is optionally instigated. In an exemplary embodiment of the invention, such login is only instigated if a default access password is stored on the target computer, so no user intervention will be required. Optionally, if a default access password is not stored, when, at a later time, a user logs into the web-based mail account, this is detected (at 716 below, for example using an installed software) and contacts may be imported.

At 716, a login is identified (e.g., during setup or at a later time). Optionally, and as described below, access to certain web sites associated with communication services is provided by software which tracks usage (in this example, web access).

At 718, a request to the web communication service is made to download contacts. In this case the web communication service will load (via the internet) the contact and/or contact information that is currently stored on the web communication service server for the specific handle used to logon. The communication service may store a full or partial list of contact information. This request may be substantially transparent to a user. Optionally, after extraction, there is an automatic logout. Optionally, contact information is also extracted by analyzing sent items and determining contacts to which a communication was sent.

Optionally, a user may approve or disapprove of contact extraction, for example, on a site by site basis or on a contact by contact basis.

In an exemplary embodiment of the invention, such extraction is repeated, for example, on a daily basis.

In some webmail services, the contact information is not directly available. Instead, a page may include some contact information, with handles, for example, available only if a link on the page is followed. Optionally, such links are followed. Optionally, a fast import and a slow import are provided. In a fast import, suitable for first time use, only contacts that do not need link following (or sent item analysis, for e-mail client) are extracted. In another example, contacts where additional contact information requires link following, are imported without the additional information. At a later time, other contacts and/or information are extracted. The limit for "fast", may be, for example, a time limit, a number of contacts limit (e.g., 100) or number of pages limit (e.g., 10).

At 722, usage of communication tools is tracked, and when detected, a contact is automatically extracted and/or a user is asked if to extract and/or save the contact. In some cases, contacts are identified by a control adding software (FIG. 8), in which case, importation may be superfluous. Optionally, at least contact information is imported, even if not used for initiating contacts, for example importing a contact's name for use in displaying an identification of a caller on an incoming calls.

Optionally, when a user imports contacts and/or at a first time use, a user can invite contacts to join the service. Optionally, a bulk e-mailing is sent to all the contacts, or to each contact individually.

Identifying Contacts and/or Handles and Adding Contact Controls

In an exemplary embodiment of the invention, three background components (described below) are run on exemplary client 300. The processes can be, for example, DLL's and/or background components of any sort. In a particular embodiment of the invention, the components are add-ons to software, rather than stand alone processes. There may be additional background components that will be loaded on the exemplary client and will support the services, activities and/or features described herein.

In an exemplary embodiment of the invention, and in line with a desire to assist a user in contacting any person using an existing handle, controls are added on the display used by a user near items which appear to be contacts. In an exemplary embodiment of the invention, the controls are automatically added without user intervention. For example, a control may be added next to a telephone number or an e-mail address shown in an e-mail, in a web page or in an "about" page.

FIG. 8 is a flowchart of a method 800 of adding contact controls on a screen, in accordance with an exemplary embodiment of the invention. As noted above, in some embodiments of the invention, a user can optionally choose if to activate this functionality and/or choose what types of software to activate this functionality for (e.g., only web pages, but not word processors). Alternatively, a user will not be given the option at all and any background process will automatically run on client 300.

At 802, various processes are automatically executed in the background. As noted above, optionally, a user may select which, if any, of such processes to execute. If the "processes" are actually add-ons, they will not technically execute until the relevant software (e.g., e-mail client, browser), are loaded.

In some embodiments of the invention, the processes analyze the screen display (or display instructions) to identify locations to be provided with controls. Optionally, different features for analyzing/adding/modifying screen display are available and/or used for different situations, including, for example, local communication programs, web (or other) based communication programs and general programs. Other classifications may be used as well. In an exemplary embodiment of the invention, the background processes running on the exemplary client enable, place and/or display the contact controls/buttons in the relevant places. For example, controls/buttons that are displayed in e-mail applications will be loaded by a specific background process for the e-mail application and/or by a background application/client/agent process that is more general.

At 804, the program being tracked is a known communication program, for example, a VOIP client or an e-mail client. Such programs are characterized by having windows which relate to communications and/or contacts and by responding to events having to do with communications. Client 300 is optionally programmed to identify such windows for specific software. Optionally, the software searched for is that which is determined to be installed on the target computer. At 804, it is identified that the software displayed a window in which contacts are expected to be shown, for example, a contact list, a message and/or a reading pane. Windows can be identified, for example, based on their window ID or on their title, class ID or any other identifier.

In one example, the first component, is an e-mail component 350, which is optionally provided as an Outlook add-in COM object. In an exemplary embodiment of the invention, component 350 identifies if outlook has an explorer window or just an e-mail window. If it has an explorer window, component 350 looks for the window using the title and looks for a reading pane window. In an exemplary embodiment of the invention, a call-up button is added under a Plaxo button (if any). Optionally, a list of software-added buttons to take into account is maintained by the client and/or server. Optionally, the title of the e-mail is shortened (e.g., placed in a scrolling box) and the control button added.

Alternatively or additionally, a button is added to a toolbar or menu of Outlook and/or the window.

In an exemplary embodiment of the invention, the added button includes a call and/or an IM button and optionally includes an option menu, for example for selecting other call types.

A similar process is optionally carried out for e-mail windows. The title of the e-mail message (and/or its class) is used to find the window ID (also has to match class). Optionally, methods similar to those used by Plaxo, to add contact buttons, are used.

In an exemplary embodiment of the invention, different settings are used for each e-mail client and/or window thereon. Optionally, an attempt is made (e.g., based on a parsing of the window structure) to locate a call button near where telephone numbers are located, for example, in "contact information" windows.

In an exemplary embodiment of the invention, when accessing a contact list including multiple handles for a person, for example in Outlook, these contacts are used for call hunting (described below) or for deciding which e-mail to call into. Optionally, server 400 determines which contacts (e.g., e-mails) e-mails are most commonly used to access a particular person.

In an exemplary embodiment of the invention, component 350 determines the identity of handle or handles used on the box 302, for example, to avoid adding callback buttons near the user's own address.

In a "to" field, a single callback button may be provided (for first one on list) or for each one of recipients on "to" list. The first recipient may be shown with a larger button. Alternatively or additionally to button controls, a "tooltip" or other control (e.g., shortcut menu) may be used.

Optionally, a bubble is shown on the screen next to each new button and/or new type of button, for example, for the first few times (e.g., 1, 2, 3, 4, 5 or more times), until a user learns to use the system. Optionally, a user can indicate to the interface of client 300 that such assistance is not necessary.

Optionally, contacts are imported each time outlook is executed.

Optionally, outgoing e-mails and/or incoming e-mails are scanned to detect contact information at the end thereof, for example as typically found in e-mail signatures.

At 806, actions relating to communications are identified, for example, the reception or sending of an e-mail, the opening of a window or the changing of a contact.

At 808, links are optionally added to outgoing communication, for example, "call me at" links that ask a receiver to join the communication service and optionally call the user back.

At 810, network access software is targeted. For example, the targeted software may be a browser accessing a web-mail page. In an exemplary embodiment of the invention, pages of interest are identified based on their title or URL or other identifier. Again, pages for particular services may be predetermined and programmed into client 300. Optionally, configuration files are downloaded from server 400, for example periodically.

The second component is a browser component 352, which is optionally an add-in for Internet Explorer (or another browser, such as Firefox). In an exemplary embodiment of the invention, configuration files and/or programming defines an expected parsing structure for web pages which are expected to be encountered. Optionally, the contents of input boxes are parsed as well. In an exemplary embodiment of the invention, the added control is a link with an illegal or non-existent address that is caught by the browser and then handled by the add-in. As noted above, in some web-mail services, for example, hotmail, the add-on may need to follow a link in order to extract handle information. Optionally, operation of pop-up blockers is avoided, the add-on emulating a keyboard command from the user to open a new window or follow a link in a new window. Optionally, the new window is automatically hidden. In some cases, page layout is changed to accommodate added control buttons.

In one example, browser component 352 identifies an e-mail address format that is displayed (name@domain.com), by parsing the web page text. Component 352 places the control next to the identified e-mail address format identified. In some cases it might also look in specified areas in the webpage and/or on the screen and/or inside specified links to extract information and/or place relevant contact controls. In one example, a web page inside a webmail account where a certain link is known to include relevant information for placing the controls or performing a call. This information can also be extracted from the specified area/link during the placement of the control/button and/or during the performance of the call/communication.

For all types of software and web pages, potential handles are identified on the display (812). This may use a third component that is an agent component 354 and may be a group of processes. Such identification may be, for example, by text parsing or by screen OCR. Optionally, the identification includes identifying contact information which is displayed near the handle. Optionally, the client software hooks the windows (or other operating system) calls to display text.

At 814, a control is optionally added to each identified handle. Optionally, a user predefines what display types and/or what handle types controls will be added to. It is a particular feature of some embodiments of the invention that controls may also be added to handles that are not registered (yet) with the communication system, expecting the above described methods to be used to join in the owners of the handles.

In an exemplary embodiment of the invention, a control comprises a clickable button. A click on a clickable button will launch the relevant communication form (Call, IM Video etc.) by calling the relevant application/program/script/web page to perform the communication initiation and execution. Optionally, a plurality of buttons are provided and/or clicking on a button shows a menu, to allow a user to choose a communication type. Optionally, the control added is a tooltip or a shortcut menu.

At 816, the identified contacts are optionally imported. Optionally, contacts are imported only if clicked on for making a call and/or if a user selects a control that adds them (e.g., a menu option). In an exemplary embodiment of the invention, call logs also have an "add to contact list" control, which may be used to add contacts to which the user made a call. Optionally, such users are added automatically.

When the control is activated, for example, by clicking, a user can optionally select (818) a call types (e.g., native to the handle type, voice, video and/or IM). Optionally, there are multiple buttons, for example, for VOIP and IM calls. Optionally, the buttons and/or options shown depended on a look-up in the contacts information (e.g., in Outlook).

In some cases, the handle is not directly available from the display, or it is desirable to obtain information from an underlying database (e.g., in outlook contacts) and the client follows (820) a link provided by the handle (e.g., in a web page) to determine the actual handle and/or additional handles or contact information. One example is for obtaining exact telephone number format (if screen shows a simplified version) or obtaining a handle of a nickname of an e-mail user shown on the screen.

At 822, a call is set up, for example as described above.

Various Exemplary and Optional Features
Call "Hunting"

In an exemplary embodiment of the invention, for example when a contact is called and there is no answer from a main contact method (e.g., the communication service), the user will optionally receive a message or a message to "call back" in the handle that has been communicated to, or automatically and/or upon user request, a contact is "hunted". In an exemplary embodiment of the invention, hunting includes attempting to contact a contact using a plurality of handles, for example, multiple e-mail addresses, landline, mobile number(s), and/or IM, simultaneously or in series (e.g., a user may be contacted simultaneously by at least 2, at least 3, or even at least 4 communication methods). If in series, a delay and/or wait time may be defined for each service tried, before moving to a next service. An order of the services may be defined, for example, per contact or per user. A beep of an answering machine is optionally identified during a call and used to automatically notify the caller or automatically move to the next handle to be called.

In an exemplary embodiment of the invention, when call hunting, the handles used are arranged in increasing order of cost to the service provider and/or user. Alternatively or additionally, handles are arranged in order of speed at which contact is made (e.g., some e-mail connections are slower than others). Alternatively or additionally, handles are arranged by priority. Optionally, priority is determined from a contacts database, for example, as found in outlook or based on habits of others (and/or the user) calling into the contact. Alternatively or additionally, handles are arranged in order of probability of successes, based on past experience from the current and/or other clients. It can be seen that in some embodiments of the invention, user call setting depends on patterns of behavior exhibited by other users. Alternatively or additionally, handles are arranged based on time of day, for example, at normal working hours putting work handles first, except for on vacation days. On vacation days, a mobile number may be preferred over a landline number. Optionally, business numbers are not hunted but still displayed.

In an exemplary embodiment of the invention, each failure to contact the contact causes a callback message to be left using the handle tried, for example, as a link. Optionally, when a user calls back, the other callback message links turn stale, in that a contact is warned when clicking on them that he had already responded to the source of that particular call. Optionally, the links are managed by server 400.

In an exemplary embodiment of the invention, answering on one communication attempt silences the other modes of contact immediately. In e-mail, for example, a request to retract an e-mail may be sent. In landline, ringing may be stopped. In an exemplary embodiment of the invention, a user can define an allowed and/or a preferred contact method. A contact may not be contacted at a quality below that allowed. Alternatively, a contact may be contacted, but when he answers, may be required by server 400 or client 300 to upgrade to the allowed quality.

Exemplary Call

Figure 9:
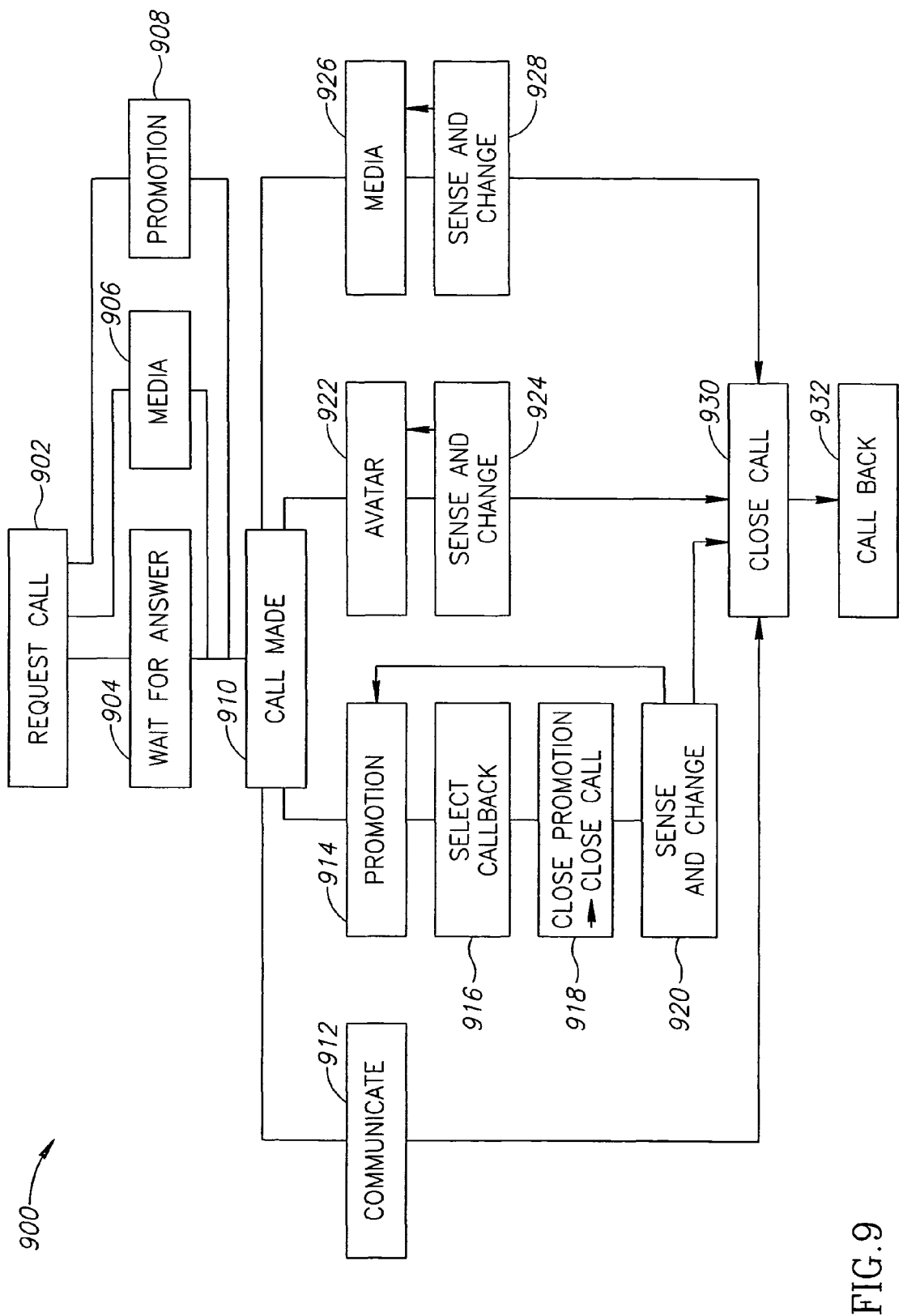
FIG. 9 is a flowchart showing acts happening during a call made in accordance with an exemplary embodiment of the invention.

FIG. 9 is a flowchart showing acts happening during a call process 900 made in accordance with an exemplary embodiment of the invention.

Figure 10:
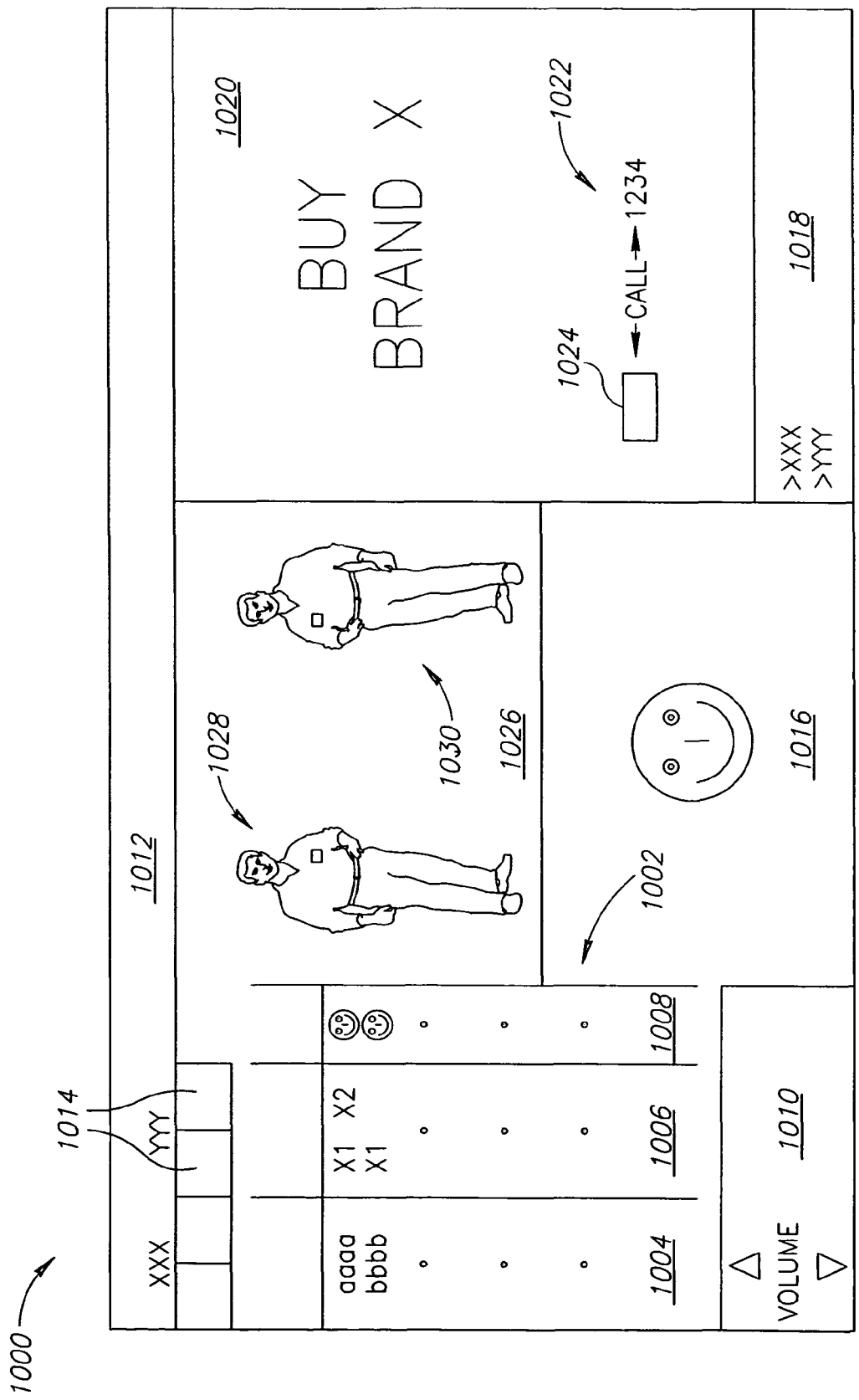
FIG. 10 is a schematic illustration of a display at a client during a call, in accordance with an exemplary embodiment of the invention.

FIG. 10 is a schematic illustration of a display 1000 at a client during call process 900, in accordance with an exemplary embodiment of the invention.

It should be appreciated that these figures are used to illustrate possible options and should not be construed as necessarily requiring all the options shown. It should be appreciated that only some of the options shown may be used.

At 902, a request to make a call is made, for example using any of the methods described above. Display 1000 is shown as including a contacts area 1002, including, for example, a list of contacts 1004, a list of handles and/or communications methods 1006 for each contact and optional presence information 1008.

At 904, the user waits for the other side to "pick up". Depending on the settings, the picking up may be automatic.

During the wait, advertisements or other types of promotions are optionally shown (908). Depending on the implementation and/or charging methods, advertisements may be shown before a call is made, during the placement of a call and/or when a call is in progress. In some embodiments of the invention, advertisements are shown only during an active call and as a condition for the call to continue. Optionally, advertisements are shown in an advertisement area 1020.

However, it is a particular feature of some embodiments of the invention, that advertisements are shown only during a call that is connected.

During the wait, media is optionally played (906), including, for example, sound, images and/or video. Optionally, the media is displayed in a call window 1016.

In an exemplary embodiment of the invention, the size of display 1000 depends on the options chosen and the progress of the call. For example, the display may initially only include contact area 1002, a menu area 1012 and/or one or more activation buttons 1014. Optionally, the display can be minimized to a toolbar or an icon. Alternatively or additionally, the display may be made smaller or bigger. However, optionally, advertisements cannot be hidden or made smaller. Optionally, advertisements are always on top. Optionally, the advertisements are in a separately managed window.

At 910 the call is made. In a video call, an image will appear in call window 1016. Optionally, one or more controls are provided in a control area 1010, for example, volume controls. Optionally, a text area 1018 is provided, for example, for text messages and/or for transferring data files. Optionally, a status area is provided (not shown). Optionally, display 1000 is made to be similar to displays a user may be used to, for example, VOIP displays.

During the call, the user communicates with another user (912). At the same time, one or more actions may happen as well.

At 914, a promotion is displayed (e.g., in window 1020). Optionally, the promotion includes contact information 1022. Optionally, a contact control 1024 is automatically added or provided so a user can call the contact information using the communication service (916). Optionally, any such promotional call is delayed until after the personal call is completed. Optionally, a user can select any text on the screen and use that text as a handle for initiating a call. In one example, an advertisement will prompt a user to open a web page showing information relating to the promoted product. In that web page, a user may request to make a call or receive a callback. In an exemplary embodiment of the invention, the callback uses the communication service and optionally uses callback lists managed for a client for non-advertisement uses.

Optionally, if a user attempts to close the advertisement window (918) the call terminates or the user is warned that it will be terminated. Optionally, the user is required to periodically pay attention to the advertisement, to prevent the call from terminating.

Optionally, the advertisement is responsive (920) to the contents of the call. In one example, the client identifies words (e.g., in text or speech, for example using speech recognition methods) and uses them to target advertisements. In another example, the client targets the advertisement based on user preferences and/or demographics of one or both of the call participants. In another example, the client identifies a tone and/or voice level to determine a level and/or type of emotion (e.g., stress) displayed by the user. Optionally, a set of images and/or behavior to be exhibited by an avatar (922, 1026, below) is predefined for each situation of the speaker and/or the two (or more) speakers). In another example, the gender of one or both of the users is identified, for example, using text analysis or based on speech characteristics. Such information may be used to target advertisements using methods known in the art.

In an exemplary embodiment of the invention, for voice calls, client 300 (or server 400) includes a speech-to-text engine that will "listen" to the conversation. The listening may be done at all times, or only during parts of a conversation. For example, software as used in Google e-mail analysis may be used.

In an exemplary embodiment of the invention, speech identification uses one of the following approaches:

(a) Use a speech-to-text engine that attempts to "translate" all the words it has listened to, and look for keywords in the text that was successfully translated.

(b) "Detect" specific keywords that are used during a conversation, by detecting the word's signature. This may use, for example, technology such as used in mobile phones, where the signatures may be speaker dependent and word dependent or as used in IVR, where the detection is typically word dependent and speaker independent.

Speaker dependent and word independent methods may be used as well.

The communication system may use the detected keywords in order to deliver ads that are relevant to the detected keywords. The relevant ads may be either delivered during the same call, or in future use of the exemplary client. The targeting engine may include features that will enable it to understand the context in which the keywords where used. For example if the word "games" was used, the system can determine if the user is talking about sports (by looking for the keywords soccer, football, basketball, etc. in the conversation), or computer games (by looking for the words doom, joystick, etc.). Techniques for targeting advertisements based on word detection, as known in the art, are optionally used.

Optionally, the system includes means for extracting information about the users participating in a conversation by analyzing their voice. The information extracted may include (but is not limited to): gender; age; mood (e.g., happy/sad); stress level (e.g., angry/relaxed); spoken language; spoken dialect; and/or telling the truth/lying. Such information may also be available by analyzing the texts used (e.g., swear words may indicate anger, slang may indicate age, grammatical articles may indicate gender).

Optionally, the system includes analysis of text (e.g., IM) exchanges. The analysis may include, for example, one or more of: the instant messaging log; emoticons used; language used; and/or detected gender (in languages that allow such detection).

The exemplary client and/or system may use the extracted information to deliver relevant ads. The relevant ads may be either delivered during the same call, or in future use of the exemplary client.

Optionally, an avatar is shown (922). Optionally, a user can choose (e.g., before or during a call) an avatar to match personal preferences and/or a second participant in the call. Alternatively or additionally, avatar selection is automatic. Optionally, the avatar is used to show promotions, for example fashion items, logos and other trademarks on clothing and/or accessories, the accessories themselves (e.g., gadgets). Optionally, the avatar is shown on a background, for example a cityscape, which, for example, can include billboards or other "embedded" advertising. Optionally, display 1000 includes an avatar display area 1026, showing a user's avatar 1028 and a second avatar 1030. if the call has multiple additional participants, for example, 3, 4 or more participants in a call, their avatars can be shown as well.

While a dedicated advertisement location 1020 is described, it should be noted that in some embodiments of the invention advertisements may be provided using any part of the user visual and/or audio display, for example, using advertisement presentation methods known in the art.

Optionally, the avatar is modified (924) based on recognition of emotion, voice and/or content, as described for advertisements. Optionally, the avatars reflect the communication between the participants. For example, when one user lower their voice, the avatars may move closer together (or at least avatar 1030). Optionally, avatars can respond to both media and the conversation. For example, the avatar may dance (or otherwise move) to the background music and react to voices (e.g., stress levels and/or amplitude), by changing the intensity of the dance.

Optionally, media is played, for example, music (926). Optionally, the media is modified (928), for example, as described above with respect to advertisements and avatars. In an exemplary embodiment of the invention, the media is also a promotion. For example, a user selecting from a plurality of styles and a promoted media (e.g., classic rock) being used, based on promotional considerations. Optionally, a user can pay to upgrade the quality and/or other properties of the media. Optionally, a user can select which promotion to use, for example, select between samples of music samples of promoted CDs.

At 930, the call is closed. Optionally, cost and/or other call summary data is shown. Optionally, a suggestion to add the participant as a contact is shown.

At 932, calls to advertisers selected at 916 may be carried out, optionally with user approval. Optionally, such calls are placed in a queue of calls the user desires to make, based, for example, on priority and/or presence of the other party.

In an exemplary embodiment of the invention, instead of making a call, a request for calling back is made to the advertiser, and the advertiser can call back at a time of his choosing.

In an exemplary embodiment of the invention, when receiving an incoming call, a user is notified by a graphic message (e.g., pop-up), a sound, a displayed image, a flashing icon and/or other alerting means. Optionally, a user can elect to answer an incoming call request by "not present" or "ignore". Optionally, the system will then complete the number of required "rings" before notifying "no answer".

Conferencing

In an exemplary embodiment of the invention, the communication system provides conferencing. In an exemplary embodiment of the invention, the conferencing uses a standard calendar program and does not require a server, for example, using Microsoft Outlook to set up a conference. In an exemplary embodiment of the invention, the calendar program is set up to reminder messages when a conference is to begin. These reminder messages are handled as call-set up requests by client 300. In an alternative embodiment, client 300 calls up the participants before the meeting, using the same e-mail addresses and/or telephone numbers used to set up the meeting as handles to contact the conference participants. In an alternative embodiment, a web-based calendar program is provided, for example, on server 400, which makes the calls using the e-mails that notify the participants of the conference.

In an exemplary embodiment of the invention, when a user calls up multiple e-mail addresses simultaneously, the user is connected with all of the addresses in a conference call. Optionally, if a user calls up another user already in a conference call, the user and/or the another user is given the option of joining the conference.

In an exemplary embodiment of the invention, a conference call may be scheduled by one or more of:
1. Using the client's scheduling/calendar interface.
2. Using the calendar of $3^{rd}$ party applications or web sites with calendar functionality. Optionally, client 300 will integrate with the $3^{rd}$ party application, web browser or web site so that the user will be able to specify that the calendar entry is a conference call that the system is responsible for. Some possible examples are:
   a. Integrating with e-mail application (like Microsoft Outlook) so that when the user creates, updates, or views an appointment:
      i. The "Location" field may include "handle-based Conference Call" or some other text in its drop down list that the user can choose.
      ii. The "This is an online meeting" field may include "Handle-based Conference Call" or some other text in it's drop down list that the user can choose.
      iii. A checkbox or push-in button that the user can check/push-in to specify that this is a conference call.
   b. Adding a button to a client toolbar that is integrated with $3^{rd}$ party web browsers, so that whenever the user creates, updates, or views an appointment in hotmail or some other webmail service, the button will allow the user to specify or be notified of the fact that this appointment is a conference call.
   c. Modify the "appointment" web page in order to add a checkbox that will allow the user to specify that this appointment is a conference call. This notification is optionally captured by the client.

In order to schedule a conference, the user may either launch the $3^{rd}$ party application directly, go to the web site directly, or use the client's main application window and have the client launch a "create appointment" window in $3^{rd}$ party applications or a "create appointment" web page in $3^{rd}$ party web sites. If the user uses the client's address book to schedule a conference with one or more contacts, the client optionally enters those contacts as appointment participants in the appointment window/web page automatically.

When scheduling a conference, the user may enter any callable communication address, or contact names as appointment participants. The user may also specify the communication address with which he/she would like to participate, or if he/she would like to be "hunted".

If entering contact names, those will optionally be conferenced-in by using call hunting. In that case, the client may provide the user with the option to choose which addresses will be used to hunt the contact and in what order.

If the $3^{rd}$ party application or $3^{rd}$ party web site is not capable of providing the user with the option to enter contact names or phone numbers as appointment participants (only e-mail addresses), the client may allow the user to do so by either choosing contact names and phone numbers from the application's/web site's address book, the exemplary client's address book, or a $3^{rd}$ party address book. Some examples are:
1. Modify the e-mail application so that the "Select Attendees" window will include contact names and contact phone numbers.
2. Modify the e-mail application so that the user can enter phone numbers or contact names directly in the window.
3. Extend the e-mail application appointment window by adding a button that launches a window from which the user can choose or enter participants, including contact names, contact phone numbers, and non-contact phone numbers.
4. Modify a webmail page so that the "Insert Addresses" window will include contact names and contact phone numbers.
5. Modify an appointment web page and add a button with similar functionality to point 3.

When choosing contact names or contact phone numbers, the client may provide the user with the option to decide if he/she would like to send the "appointment" e-mail message to the participant, if the participant has one or more listed e-mail addresses. If the participant has more than one listed e-mail address the client may also provide the user with the option to decide which e-mail address(es) to send the "appointment" message to.

The "appointment" e-mail message may be "intercepted" by the client before it is being sent out. Some "interception" examples are:
1. Use e-mail application's add-in API to intercept the message.
2. Use web browser's API to intercept the click on the "send" button.

Once intercepted, the client may do some or all of the following:
1. Customize the message.
2. Send information regarding the appointment to other system or $3^{rd}$ party devices.

3. Modify the "meeting request sent" confirmation web page.
4. Redirect the user to a system generated "meeting request sent" confirmation web page.

If the "appointment" message is being sent to a handle/e-mail address that doesn't exist yet on the communication service, the client may customize the message in order to include an "activation" and/or a "join the conference" link in it. The "join the conference" link will optionally have similar functionality to the "callback" link.

If the appointment has been sent to handles/e-mail addresses that exist on the communication service, the client may "detect" conference call appointments. Some detection examples are:

1. Use the e-mail application's add-in API or web browser's API to detect:
   a. The message reception.
   b. Its approval or rejection.
   c. The creation or deletion of its calendar entry.
2. Use its integration capabilities with $3^{rd}$ party calendars (in both $3^{rd}$ party applications and/or $3^{rd}$ party web sites) to "read" the calendar and "detect" conference calls.

Once detected, the client may do some or all of the following:

1. Add it to its own calendar.
2. Send information regarding the appointment, including its status to other system or $3^{rd}$ party devices.
3. Notify the user that this is a conference call along with additional information.

The client may provide participating users/handles with reminder(s) with regard to the conference call, prior to its start.

The conference call may be initiated and all its participants "conferenced-in" in any means by which the system is capable to initiate and host calls and conference calls, including one or more of the following means:

1. The client on the user setting up the conference device, is responsible for "conferencing-in" all the conference participants.
2. The client on another participant's device is responsible for "conferencing-in" all the conference participants.
3. "Conferencing-in" responsibility is distributed between the client installations on some of the conference participant's devices.
4. One or more $3^{rd}$ party system or non-system devices are responsible for "conferencing-in" all the conference participants.
5. The responsibility is distributed among the devices in points 3 and 4.

The conference call may be mixed by any one or more system or non-system devices, including (but not limited) to:

1. The device of one of the conference participants.
2. A $3^{rd}$ party system device.
3. A $3^{rd}$ party non-system device.

Presence

In an exemplary embodiment of the invention, the communication system manages and provides presence information, for example, indicating to a user if some particular users are present or not. Optionally, presence is set by the user, for example, marking himself as present or not present. Optionally, presence is automatically determined, for example, based on usage of a computer and/or time since last contact with an input device. Optionally, presence methods as used in existing popular instant messaging applications, such as MSN, Yahoo, ICQ, AOL, are provided.

In an exemplary embodiment of the invention, a user can mark himself as not present or less present to a single contact or a group of contacts, for example, excluding personal contacts during work hours. In an exemplary embodiment of the invention, presence is provided next to contacts/detected handles, including for handles where their native system does not support presence information.

In an exemplary embodiment of the invention, presence is exported based on user preferences. Optionally, if a user had completed a call with a contact (and/or or tried to complete a call) through the communication system, then his presence status is automatically available to that contact, unless specifically excluded. Optionally, this is based on the premise that if a person called another person, then they are "friends" and would like to know if the other is available. Optionally, a certain number of calls and/or certain frequency of calls is required to make presence status thus available. Optionally, presence status visibility is settable by setting user preferences.

Optionally, the fact that presence status is exported to a contact is marked by an icon near that contact. Optionally, such contacts are provided at a top of a contact list. Optionally, alternatively or additionally to presence status showing, any contacts where an attempt to call has been made (but not completed) are marked. Optionally, such contacts are also brought to a start of a contact list, optionally by selecting a control feature. Optionally, various means of managing callback and call log lists, such as known in the art of CRM, are provided.

In an exemplary embodiment of the invention, the presence indicator shows various statuses as commonly known (online, offline etc.). Optionally, the presence indicator is shown next to or in relevance to any control/button/s that are identified by the exemplary clients background processes and/or any contact/handle that is identified on the exemplary client as a handle that may be communicated with. Presence is optionally shown for any handle that has presence information on the communication service.

Alternatively or additionally to the standard privacy and presence management features found on the market (e.g., in instant messengers, internet phones, etc.), the system may include one or more of the following:

1. Automatic presence status and/or info change based on the user's activity within the software. For example, On the phone/On a call, Instant Messaging/IMing, etc.
2. Automatic presence status and/or info change based on the application the user is using. If the application is a document handling application, such as Microsoft Word or PowerPoint, the presence information may include information regarding the open document. If the application is a web browser, the presence information may include information in regards to the open web site and/or web page. The user's activity may also be logged by the software.
3. Automatic presence status and/or information change based on the user's activity in $3^{rd}$ party applications. For example, if the user is composing an e-mail message in an e-mail client or webmail account the software integrates with, change his/her presence status to "Writing an e-mail"/"Busy"/other.
4. Automatic presence status and/or information change based on the information found in calendars the software integrates with. For example, if an appointment is present in the user's outlook calendar or hotmail account calendar, change the presence status to "In a meeting" and, optionally, include information in regards to the appointment.

5. Scheduling of presence status changes. For example, presence status of available during normal business hours and of unavailable/appear offline/offline during non-business hours.
6. Scheduling of presence info availability. For example, share presence information during normal business hours and do not share during non-business hours.
7. Blocking of specific communication methods. For example, block users from calling but not from instant messaging a user.
8. Granular sharing of presence info. The user may be provided with the option to:
    a. Not share the presence information (Unknown).
    b. Share only the presence status (Online/Offline)
    c. Share the presence sub-status (Available/Busy/etc.)
    d. Share extended presence info (On a call with David, IMing with Mark, Working on the file . . . in Word)

These presence and/or privacy features are optionally applied by the user on a per contact, per contact group, per e-mail address domain and/or per client account basis. For example:
1. The user may decide his/hers sub-presence status on a per user basis.
2. The user may decide to share extended presence info only with his/hers co-workers and bosses.
3. The user may decide that during meetings, only specific contact groups may call, but not instant message him/her.

Automatic Redial after a Specified Period when Call Waiting

In an exemplary embodiment of the invention, if a handle that is called is currently busy, a call waiting message/sound may be heard. In an exemplary embodiment, the handle may be periodically automatically called until there is an answer and the handle is not busy anymore. If the handle is available there will either be an automatic communication connection or the caller/initiator of the communication may be notified via a visual or a sound notification Joining the Communication Service, by Clicking on a Specified Button on a Website In an exemplary embodiment of the invention, clicking on the specified button (next to a handle or general) will initiate an installation process (download or web based) that will load the code needed to make a call with a handle representing the website. This process may be a multi-phase where at first the minimal code to make a call is loaded and additional phases will load code that will support additional features. Optionally, the handle used is an anonymous/temporary handle that is automatically supplied during the loading process and/or the user will be required to enter a handle (like e-mail address) that will be optionally validated immediately or at a later period.

Joining the Communication Service Via a Multiple Step Installation

In an exemplary embodiment of the invention, when a link in a "callback" e-mail or message or a link/button on a website is clicked—the minimal code/software that is downloaded and run, supports the ability to do an immediate call or call back. Additional software/code is downloaded and run during a second (or multiple) additional phase. Such additional software may support, for example, import, identifying handles and/or placing controls and/or other features such as described herein.

Video Calls

In an exemplary embodiment of the invention, video calls on no-supporting devices are provided by the client and/or server splitting a call into two parts, a voice part which is transmitted to a telephone line and a video part which is transmitted to a client. This may be useful, for example, if landline voice quality is better or if one of the participants may need to leave a call. Optionally, when a participant disconnects, he is "hunted" and the other participant is not immediately disconnected. Optionally a message may be provided while waiting for the hunt to succeed.

Business Features

In an exemplary embodiment of the invention, server 400 and/or client 300 provide features useful for business users. In one example, server 400 acts as an enterprise PBX, which manages in-house VOIP calls and also servers as a gateway or portal to outside communication. Optionally, the server tries to cause targets of calls to join the communication service as described herein.

Exemplary particular features are call forwarding, call recording, voice and media mail, text-to-speech and/or SMS delivery.

While, in general, the exemplary embodiments system provides services for communication between people, in some embodiments of the invention, one of the "users" is a computer. For example, this feature can be used for telemarketing, for automated message services, and/or for an automated help desk or call distribution center.

Interaction with Existing Communication Services

In an exemplary embodiment of the invention, the methods described herein can be used for existing, closed systems. For example, in Skype, a user can call anybody and if the call "fails" the "anybody" will receive a call back message that installs and registered the Skype client. At a later time, the call recipient can change his handle from the one "assigned" by the initial caller. Optionally, the assigned handle includes an indication of the communication system, for example, "Skype!anybody@mail.com", if the handle used is "anybody@mail.com".

In another example, the client and/or server install a Skype client and pretend to the Skype system that this newly installed client is the originator of a call, rather than client 300, which may remain anonymous. Optionally, one or more Skype (and/or other communication system clients) are provided preinstalled and registered for use in such gateway activity.

In another example, if a user request contact with a person having a known communication service (e.g., based on contact listing), the local client may transfer the call to be handled by the service. This feature may be useful, for example, if a user does not remember all the handles of the other person. Optionally, the decision to transfer the call to the known communication service (e.g., Skype) is made by the recipient's client 300. Optionally, the known service is downloaded and installed on the user's computer, if needed.

Exemplary System Configurations

In an exemplary embodiment of the invention, the communication system is organized as a peer-to-peer network, for example, as used for file sharing. Once a call is set up, the communication between two clients may be direct (e.g., over an IP network) or may use an intermediary client as a node.

In an alternative embodiment, the system is arranged as a server based system with a single or a hierarchy of servers, for example, running methods as described herein.

In an alternative embodiment, the system is arranged as a server based system, using servers of an existing communication method and using the additional methods as described herein as an add-on to that system, for example, for user joining and fast person lookup.

Use of Client 300 with $3^{rd}$ Party Networks

Client 300 optionally may be used with $3^{rd}$ party VOIP networks, such as broadband phone services (Vonage, AT&T CallVantage, etc.) and/or enterprise VOIP networks, and/or any other VOIP network or other protocol (e.g., SIP, H.323, RTP, MGCP, etc.).

Client 300 is optionally used with 3$^{rd}$ party IM networks, such as public IM networks (MSN, Yahoo!, ICQ, AOL, etc.) and/or enterprise IM networks, and/or any other IM networks the exemplary client is made compatible with, protocol wise (e.g., SIP, SIMPLE, Jabber, XMPP, CPIM, etc.).

Optionally, client 300 will use a user's account at the 3$^{rd}$ party VOIP or IM network to "sign-in" and communicate through the 3$^{rd}$ party network, and allow the user to use some or all of the client features that are not specific to the system's communication service network.

Optionally, to support this ability, client 300 provides the user with the option to specify his/hers 3$^{rd}$ party network account credentials (such as username, password, SIP address, etc.) and/or additional 3$^{rd}$ party network specific configuration options (such as SIP registrar, SIP proxy server, etc.).

Exemplary Business Models

In an exemplary embodiment of the invention, the above methods and apparatus are leverages to generate revenue. Various methods may be used, including, for example, the methods described below and/or combinations thereof.

In a first method, promotions are used to sell items and/or services to users, for example, media that is being played during a call. A portion of such revenue optionally pays for system usage.

In another method, advertisement space and/or targeting is sold to advertisers.

In another method, users pay for premium services, for example, landline calls, conferencing and/or voice mail. Optionally, voice mail is provided by the client itself, when a user does not answer. Optionally, server 400 provides the voice mailbox, for example, for cases where the client is off. Optionally, what is paid for is server services, for example, gateway services, alternatively or additionally, to client based and/or network based services.

In another method, users pay for connection time, connection quality and/or bandwidth, tracking being done, for example, by client 300 and/or server 400.

In another method the methods are used for CRM (client resource management), and a user pays for use of a CRM software and/or features.

In another method, client attraction and call set-up services are sold to existing carriers, such as Skype and Vonage. Optionally, the actual handle used in such systems is a native handle, rather than e-mail.

In another method, the system is integrated with calling card systems, as follows. In an exemplary embodiment of the invention, client 300 may provide the user with the option to use calling cards he/she has purchased from 3$^{rd}$ parties (such as at callingcards.com, or at a 7-11), and to use them, when calling some or all destinations. For a calling card, the user will optionally have the option to:

1. Specify one or more access numbers, in order of preference.
2. Specify the calling card's PIN;
3. Specify the destinations he/she wishes the calling card will be used with. For example, only use it when calling non-US numbers. If more than one calling card may be used to call a destination, specify the calling card order of preference.
4. Specify one or more accounts through which the calling card access number should be called, in order of preference. For example, call the access number through my business SIP address (first), or through my Vonage account (second).
5. If the calling card's service provider IVR is a non-straightforward one, either:
   a. Enter the required IVR sequence manually. For example:
      i. Press 1
      ii. Pause
      iii. Enter PIN
      iv. Pause
      v. Enter number
6. Or "record" the required IVR sequence once, and use it in subsequent uses of the calling card.

In an exemplary embodiment of the invention, at least some of the communication services are provided free of charge (as well as being freely joinable as described above). In one embodiment, the services are provided free so as not to stop the flow of registration and calling back. Optionally, the free services are limited as to time, amount of communication, contacts and/or features available. Optionally, a user receives an incoming calls suggesting he upgrade to pay services.

In an exemplary embodiment of the invention, when calling back, the service is free and/or paid for by the originator of the call.

Telephone Portal

Figure 11:
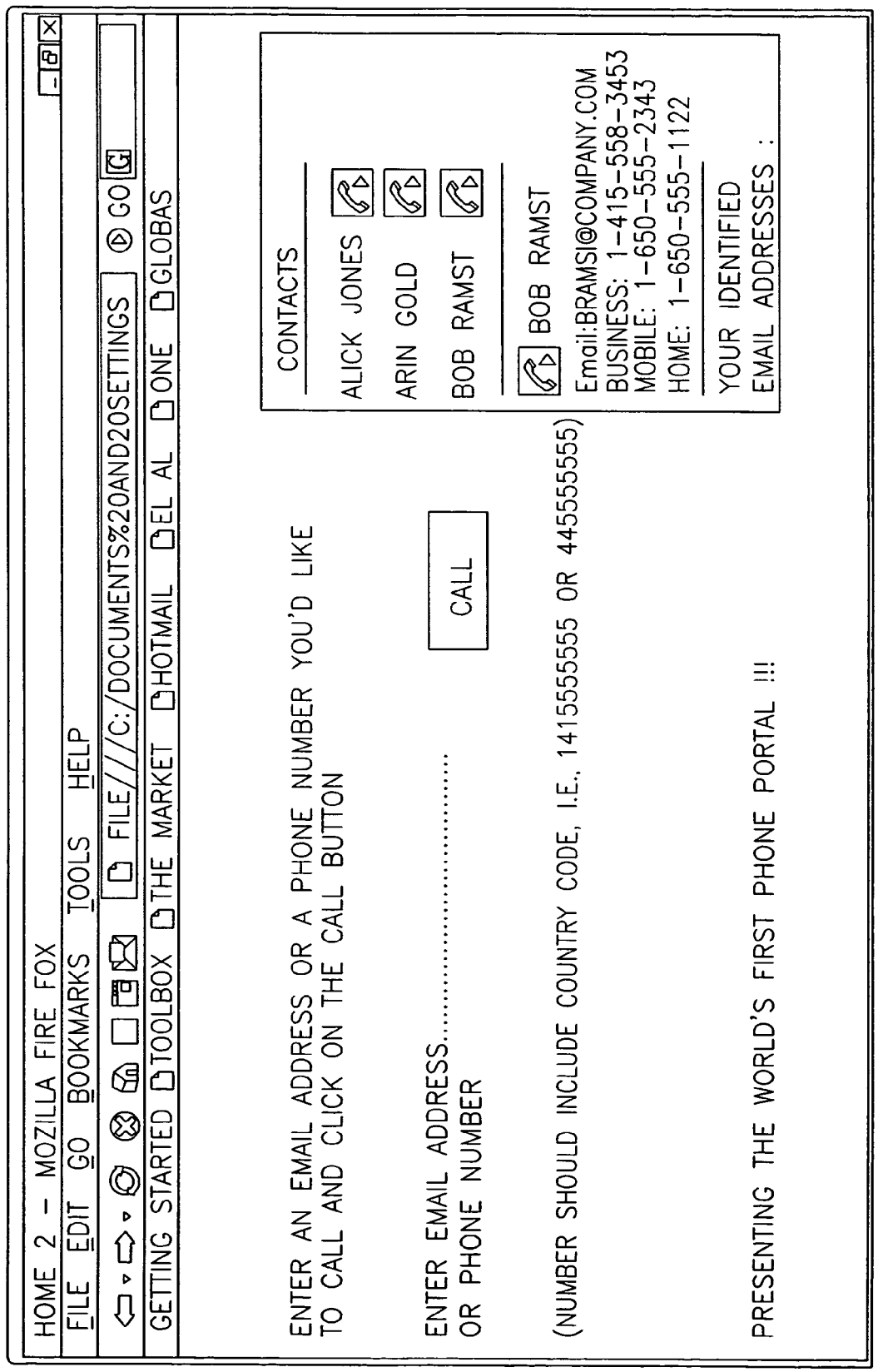
FIG. 11 is a schematic showing of a communication portal, for example, for telephone numbers, in accordance with an exemplary embodiment of the invention.

FIG. 11 is a schematic showing of a communication portal, for example, for telephone numbers, in accordance with an exemplary embodiment of the invention. In an exemplary embodiment of the invention, the portal is accessed through a web browser (or other network access program) allowing calls/communication to handles to some or all of the following (e.g., using methods as described herein):

(a) telephone numbers
(b) E-mail addresses as handles, as described herein
(c) VOIP or phone addresses on 3rd party VOIP or telephony networks
(d) SIP or H.323 addresses The telephone portal may include a downloaded unit of software (such as an ActiveX or Java applet) that will be responsible for certain aspects of the portal's functionality (some of them will be described thereafter).

Optionally, the telephone portal allows one or more of the following usage methods:

(a) Anonymously—no need for the user to login
(b) By signing into a user's account (may be done automatically by using cookies or remembering a unique device identifier, e.g., using "Remember my ID on this computer/Remember my device" functions)
(c) By signing into a 3rd party SIP/VOIP/Telephone network (optionally this is done automatically, optionally after a user is verified using his handle). Optionally, the telephone portal acts as a gateway to the actual network into which the user signed in In an exemplary embodiment of the invention, the telephone portal provides address book/contact management capabilities, including one or more of the following:

Remembering the user's outgoing calls, by using cookies or saving them in a database (e.g., by account used to sign in and/or by a unique device identifier)
Exposing the user's address book
Importing or displaying contacts from e-mail applications (such as outlook or outlook express), by using a downloaded piece of software (such as an ActiveX unit)

Importing or displaying contacts from webmail service providers (such as Hotmail or Yahoo! Mail), by one of the following means (generally described in greater detail above):

- Getting the webmail account username and password from the user, signing in and "reading" the user's address book at the webmail account. The webmail account username and/or password may be remembered, between browser sessions.
- Asking the user to sign into the webmail account in another browser window or frame (or iframe), and using scripts or a downloaded piece of software (such as an ActiveX) to "read" the user's address book at the webmail account.
- Optionally, the telephone portal reads the e-mail messages at the webmail account to create a list of e-mail addresses and/or contacts (e.g., by "detecting" e-mail signatures). Some or all of the items on the created list may be saved by the user for future use, by using cookies, or saving them in a database.

The user may use the address book/contact manager to choose an address or phone to call.

The user may have the option to synchronize or export his/her web portal address book to a 3rd party address book, such as his/her Outlook, Outlook Express or a webmail account address book, for example using methods as described above.

Optionally, the telephone portal may display advertisements before and/or during and/or after the call. The advertisement paradigm is optionally the same paradigm as described above, including, for example, one or more of:

Includes categories, call-through to advertiser.

Closing the browser window will disconnect the call.

Minimizing the browser window will keep a small advertisement window open, in the form of:
- An additional browser window that can't be closed or minimized or that is re-opened or restored as soon as it's closed or minimized.
- An operating system window that is created by a downloaded piece of software (such as an ActiveX) and that can't be closed or minimized.

Optionally, the user may access the phone portal by one or more of:

(a) Visiting the portal's web site.

(b) Initiating a call from a quick dialpad in which the user enters a destination address or phone number and clicks a call button. Once the call button is clicked, the user will be taken to the portal in an existing or new browser window, and the call will be automatically initiated. The dialpad functionality is optionally packaged within/is part of a:

(1) Communication service or 3rd party web site.
(2) Communication service or 3rd party browser toolbar.
(3) An extension to an existing toolbar or a new toolbar that appears in a 3rd party application, such as outlook.
(4) A toolbar that appears on the desktop.
(5) Anywhere in a 3rd party application that is able to load the web portal in an existing or new browser window and send the address or phone to call to the portal. This may be implemented in a manner similar to a Google search functionality which is accessible from within various applications, such as ICQ.

Optionally, the quick dialpad provides the user with the functionality to choose from a list of addresses or phone numbers to call. For example, the list may display:

(i) Addresses or phone numbers listed on a web page (in the browser toolbar case).

(ii) Address book entries in the user's webmail account (the browser toolbar may be used to "read" the user's webmail account address book, while the user is visiting the webmail account).

(iii) Contact entries in an e-mail application (if the dialpad is part of an e-mail client).

(iv) The toolbar may be configured to remember the user's webmail account(s).

Exemplary Technical Implementation

Following is a general description of a particular implementation ("yoomba") which may be provided in accordance with an exemplary embodiment of the invention, and including details not generally necessary to a person skilled in the art, but possibly assisting in understanding possible implementation of the above description. In particular, many of the acts described may be omitted (even if described as necessary, as they may be only necessary for the particular implementation and/or features), changed and/or their order changed, for example, as suggested above, but not only.

1 Activation Request Process Flow 1.1 Website Activation Request 1.1.1 User goes to www.yoomba.com 1.1.2 User enters email address (ronen@babayoff.com) at homepage (or any other page) and clicks Join/Rejoin/Activate 1.1.3 Email address is sent to yoomba web server.

1.1.4 A UUID/GUID (global unique ID) is generated for an email message that will be sent and is stored, together with the email address in a "Sent Emails" table in yoomba database.

1.1.5 An email is sent to the email address. The email includes a link to yoomba web server. The link includes both the email address and the email message GUID. For example:

https://www.yoomba.com/SignOn?email=ronen@babayoff.com&msgGuid=107c86b2

Optionally, an email will always be sent, even if the email address is already active, so the user can always reinstall the client, install it on a new computer, or sign on from a computer he didn't sign on from yet. The wording of the email message and/or returned web page may be different.

1.1.6 A "go check your inbox" web page is returned to the user.

1.2 Viral Activation Request 1.2.1 A user that already has the client installed tries to call/IM an email address.

1.2.2 The client queries a central location server to see if the email address is active and online.

1.2.3 If the email address is not active, the central location server generates a new email message GUID, as the one above, but also stores in the "Sent Emails" table the callback address (in all contexts in this description "callback address" means an address that may be used to either call, IM or initiate any other communication type the communication client supports).

1.2.4 It then sends an email message similar to the one above, but where the link also includes a callback address. For example:

https://www.yoomba.com/SignOn?email=ronen@babayoff.com&msgGuid=107c86b2&callback=eladh@gmail.com&type=IM Optionally, in order to avoid spam filters and/or spamming, once a callback request was sent from one user to another, the server will not generate and send another callback request from the same user to the other within the next X period of time (the default is one day), even if the user tried to contact that email address again and again.

2 Activation Process Flow
  2.1 If Activation Via Outlook
    2.1.1 User checks his outlook and clicks on the link.
    2.1.2 The user's default web browser opens.
  2.2 If Activation Via Webmail—User checks his webmail and clicks on the link.
  2.3 The web browser sends the email address, email message GUID, and the optional callback parameters to yoomba web server.
  2.4 The web server verifies that the email address and email message GUID exist in the "Sent Emails" table.
  2.5 If it does, this verifies that the web server sent the email message and that the email was sent to that email address. Therefore, it verifies that the user clicking on the link is one with access to that email address.
  2.6 The web server checks to see if the email address has already been activated.
    2.6.1 If it hasn't been activated, a password is automatically generated by the web server. The email address, together with the generated password is stored in an "Active Accounts" database table.
    2.6.2 If it has been activated, the user's password is fetched from the "Active Accounts" database table.
  2.7 The web server checks the browser that was used for the HTTP request (it's an HTTP request header).
  2.8 If Activation via IE
    2.8.1 The web server returns a dynamic web page that includes a reference to the code signed "Setup ActiveX Control", the email address and password, the optional callback parameters, and client side scripting.
    2.8.2 Scripting is used to check if the latest required version of the setup ActiveX is already installed.
    2.8.3 If it isn't, the web page tries to install the setup ActiveX (IE may ask the user to enable ActiveX on the web page and/or to agree to install the setup ActiveX).
    2.8.4 If the setup ActiveX is installed successfully or is already installed
      2.8.4.1 The setup ActiveX is asked to check if the client is already installed.
      2.8.4.2 If the client isn't installed
        2.8.4.2.1 Scripting is used to ask the ActiveX to download the code signed setup.cab file.
        2.8.4.2.2 Scripting is used to query the ActiveX on the download progress and display the progress on the web page.
        2.8.4.2.3 Once download completes, the ActiveX extracts the setup.exe file from the setup.cab file.
        2.8.4.2.4 The ActiveX stores in the persistent client properties storage (which may be a file, a set of files and folders, or the registry):
          An ActiveXLaunchedSetup Boolean property indicating that the setup file was downloaded and launched by the ActiveX. See "first sign on", below, for additional details.
          The email address and password to use for the next sign-on.
          The address to call/IM on next sign, in the email address' properties, if a callback address exists.
        2.8.4.2.5 The ActiveX launches the setup.exe file.
      2.8.4.3 If the client is installed
        2.8.4.3.1 Scripting is used to ask the ActiveX to sign on the email address and, if a callback address exists, call/IM the callback address when signed on.
        2.8.4.3.2 The ActiveX sends the sign on and the optional callback parameters via COM to the communication client.
        2.8.4.3.3 If the email address is already signed on—the client will initiate the call/IM immediately.
        2.8.4.3.4 If it isn't
          2.8.4.3.4.1 The client will save the callback address in the email address' properties as the address to call/IM on next sign on.
          2.8.4.3.4.2 If another email address is already signed on, the client will sign it off.
          2.8.4.3.4.3 It then signs the email address on.
    2.8.5 If the setup ActiveX could not be installed—The user is redirected to the web page in 2.9.1, and the same activation process as the one for Firefox is being started. See "Activation via Firefox", below.
  2.9 If Activation via Firefox or not using the setup ActiveX
    2.9.1 The web server returns a page with:
      A script to start downloading the setup.exe file automatically.
      A link that the user can use to download the setup.exe file if the download doesn't start automatically.
      An HTTP cookie that stores the email address, password, the optional callback parameters, and the date of the cookie generation.
    2.9.2 The user may request the browser to launch the setup.exe file when download completes, when the browser notifies him on download completion or may do it manually at a later stage.
    2.9.3 An alternative to this process is to generate a custom setup file that also stores the email address, password, and the optional callback parameters in the client properties as part of the setup.
3 Setup Process Flow
  3.1 Setup displays an EULA to the user.
  3.2 Setup checks to see if IE, Outlook or Outlook Express are running.
  3.3 If any of them is running
    3.3.1 It prompts the user to close them manually and click OK:
      When closed.
      Or if user wants the setup process to close them for him automatically.
    3.3.2 Setup checks if any of them is still running and for each one running, tries and closes it gracefully, and after a period of time, not gracefully, until it is closed.
  3.4 Setup installs the software, which includes (for example one or more of):
    The Communication Client
    The IE Add-On
    The Outlook Add-On
    The Outlook Express Add-On
  3.5 Setup launches the communication client.
4 Client First Run Process Flow
  4.1 The client looks up a NotFirstRun boolean property in the client properties.
  4.2 If it doesn't find it, the client checks to see if it was downloaded by the ActiveX by looking up an ActiveXLaunchedSetup boolean property.
    4.2.1 If it was, it sets NotFirstRun to true and start the sign on process.
    4.2.2 If it doesn't find it, the client checks in the cookies storage of all the web browsers for which it knows how to access the cookie storage, for the latest cookie that was returned from yoomba web server, and sets NotFirstRun to true.

4.2.3 It if finds a cookie, it fetches the username, password, the optional callback address and callback type, stores it in the client properties, and starts the sign on process.

4.2.4 If it doesn't find a cookie, it displays the sign on screen.

5 Sign On Process Flow 5.1 User signs on.

5.2 Client checks to see if a callback on sign on property exists in the email address' properties, and if there is one, it initiates the call/IM to the callback address. The process continues only after the call/IM session ends.

5.3 Client checks to see if it needs to execute the Webmail First Import process flow.

5.4 Client checks to see if it needs to execute the Outlook First Import process flow.

5.5 Client checks to see if it needs to execute the Outlook Express First Import process flow.

6 Webmail First Import Process Flow 6.1 If the email address is one that belongs to one of the supported webmail accounts, the server may return a property of FirstWebmailImportCompleted.

6.2 If FirstWebmailImportCompleted is false or doesn't exist, the client opens IE on the web account sign on page, and instructs the IE Add-On to do a first time fast webmail import followed by a regular webmail slow import. IE is opened in a hidden way, or is automatically hidden upon opening.

6.3 If the client system (meaning all the software that was installed as part of the setup) finds out that the email address wasn't automatically signed on to the webmail account, the user is notified and asked to sign on in order to start the first time webmail import process.

6.4 If it agrees and signs on, the import process is initiated in the same way as regular webmail import (by opening a new hidden browser window).

6.5 In the first time fast import, the contact info is imported:
  6.5.1 In hotmail, only from the info available in the Contacts page.
  6.5.2 In Yahoo, only from the info available in the first X (X is configurable) Addresses page.
  6.5.3 In Gmail, only from the info available in the All Contacts page, and after moving to the basic HTML view of gmail.

6.6 After completing the fast import, the client is notified, and the contacts are loaded into the client.

6.7 The client notifies the server to set the FirstWebmailImportCompleted property to true, immediately, or at a later stage.

6.8 Note that the user may be asked to allow the import now, not now, or never, and if he choose not now or never, the FirstWebmailImportCompleted will be set to true in the email address' properties, and if he choose never, the NeverImportWebmailContacts will be set to true as well.

6.9 It should be noted that the system may or may not store imported contacts on the server and make them available to the user when he signs on from other machines. In such cases, the process may be part of 6, and FirstWebmailImportCompleted will be fetched and stored in the local email address' properties.

7 Outlook First Import Process Flow

It should be noted that this process is generally the same for Outlook Express 7.1 The client checks if the machine has Outlook.

7.2 If it has, it checks in the client properties if FirstOutlookImportCompleted is false or doesn't exist.

7.3 If yes, the client system start the outlook contacts import process automatically, if it hasn't started yet (it may have started if the user opened outlook beforehand).

7.4 Optionally, before starting the import, the client may ask the user if he wishes to import outlook contacts now, not now, or never.

7.5 Optionally, the client checks if the email address is configured as an outlook email account. If it isn't, it may ask the user if he wishes to import the contacts anyway now, not now, or never.

7.6 At the end of the import (or import refusal) the client sets FirstOutlookImportCompleted to true in the email address' properties, and if the user never wants to import contacts, it sets NeverImportOutlookContacts to true as well.

8 Callback/IM Back For Active Users Process Flow 8.1 A user tries to call/IM an email address.

8.2 The central location server is contacted to see if the email address is active and online.

8.3 If it is active but offline, a callback email message, similar to the one in 1.2 is sent to the user. The email includes a link to yoomba web server. The link includes both the calling/IMing user (ronen@babayoff.com) and the called/IMed user (eladh@gmail.com). For example:
https://www.yoomba.com/SignOn?email=eladh@gmail.com&callback=ronen@babayoff.com&type=Call Optionally, a spam protection mechanism is used as in 1.2.

8.4 Once the user clicks on the link, and if he reaches the web sever (see 6 for when it doesn't reach the web server), the exact same flow as the Activation Process Flow starts.

9 IE Add-On Interception of Activation and Callback URLs Process Flow 9.1 Interception Before Navigation
  9.1.1 The IE Add-On checks every URL the user navigates to before navigation starts.
  9.1.2 When it identifies one of those URLs (by checking for www.yoomba.com/SignOn?, for example), it jumps to 6.3.
  9.1.3 It then cancels the navigation.
  9.1.4 In some circumstances, it may also close the browser window, for example if it knows that the browser window is a new window that was created in order to navigate to that link.

9.2 Interception On Document Load
  9.2.1 For every webmail service supported (gmail, hotmail, etc.), the IE add on checks in the view email message page, if the link exists in the message body.
  9.2.2 If it does, the add-on monitors clicks on that link, and when clicked, jumps to 6.3.
  9.2.3 It then cancels the click action.
  9.2.4 Optionally, the add-on may also be configured to search for that link on every web page, not only on the ones above.

9.3 It asks the client (via COM) to sign the user on and, if a callback address exists, to call/IM the callback address, when signed on. It also provides to the client the email message GUID.

9.4 The client then performs the steps in 2.8.4.3.3 or 2.8.4.3.4, but before 2.8.4.3.4.3 it checks if the email address has already signed on from that computer, and if it did, signs the user on using the stored password. If it didn't, it uses the email message GUID as a validation proof in the sign on process, optionally receiving from the sign on server the password, in the sign on response.

10 Webmail Import Process Flow

The client may import contact info from the user's webmail account periodically, or upon demand. The import is initiated as follows:

10.1 Every time the user navigates to a page in his webmail account (after he's signed in), the IE Add-On checks if it needs to start importing webmail contacts.

10.2 If it does, it simulates a Ctrl-N to open a new browser window, it sets a flag that will instruct the new browser window to hide itself automatically, and to start importing webmail contacts.

10.3 Once the new browser window is opened, it starts importing webmail contacts by using the IE API to navigate to all the webmail specific contact pages, and extract the info from there.

10.4 Gmail specific—before starting the navigation to the contact pages, it first moves to the basic HTML Gmail view.

10.5 The IE Add-On also checks if the Ctrl-N succeeded, by checking if the contact import started, and if it didn't, continues to issue Ctrl-N every time the user navigates to a new page.

11 Exemplary Network Design And Protocol 11.1 Network Topology

The network can be implemented as client server network or as a P2P network. Since the network supports VOIP, in the P2P network case, a non-structured overlay topology may be preferred over a structured overlay topology, at least for the media relaying purposes, in order to increase call quality, but this is not necessary.

11.2 Signaling Protocol

The network may use a signaling protocol such as SIP, or any other standard or proprietary signaling protocol.

11.3 Network ID

Since the network utilizes the user's email address as a unique network identifier, it may either use it directly as an identifier, or use a one-to-one mapping from an email address to the user's network ID. For example, yoomba may manage its own SIP domain and every user gets a SIP address of EmailAddress@yoomba.com, where in the EmailAddress part the '@' is replaced by a '!', so there won't be two "@" signs in the SIP address. For example:
ronen!babayoff.com@yoomba.com 11.4 NAT, Firewall & HHTP Proxy Support The network may support clients behind as many NAT firewall and http proxy configurations as possible. Following are a list of features that may be used in order to maximize the number of clients that can connect and communicate over the network.

11.4.1 NAT Support

Many of the signaling protocols, such as SIP, are not NAT friendly. To avoid NAT related problems:

11.4.1.1 Clients may use standard protocols such as STUN to find out about their NAT mapping.

11.4.1.2 Whenever a device communicates with a peer device (such as a server, another client, etc.), the peer device may treat the mapped address (the one it sees for the device) as the contact back address for that device.

11.4.2 Firewall Support

Since VOIP and specifically RTP is a real-time protocol, most of its standards and implementations support only UDP. Not only that, they do not support situations in which peers (clients) cannot communicate with each other directly. Examples are:

Firewalls that support outbound TCP only.

Firewalls that support outbound TCP only over port 80 and optionally verifying that the data is HTTP.

Firewalls that support outbound TCP only over port 443 and optionally verifying that the data is SSL/TLS.

Firewalls that support outbound TCP only over port 80 and/or 443 as above, and only via an HTTP proxy.

Symmetric UDP NATs (see STUN)

Symmetric UDP Firewalls (see STUN)

Any combination of the above.

To support those configurations, a network device may try and use the best communication protocol first (usually UDP), and only if it didn't succeed fallback to the $2^{nd}$ best, $3^{rd}$ best, etc. It may also use:

11.4.3 HTTP Support

The client may decide to communicate with an outside device using HTTP and if media flow is required, "download" and "upload" the media flow is a "binary file".

If used for signaling, the signaling messages, such as SIP requests and responses, may be sent as the body, or the attachment of multiple HTTP requests and responses (assuming HTTP Keep-Alive is used).

11.4.4 HTTP Proxy Support

In some circumstances, outbound access may only be limited to access via an HTTP proxy. In those circumstances, the client may try and detect the http proxy to use to contact an outside device, and if found:

11.4.4.1 Contact that device via HTTP, in the same manner as above.

11.4.4.2 Contact that device via TCP or via SSL/TLS, and connect to that device using the HTTP CONNECT request (also known as HTTP tunneling), if the http proxy allows it.

11.4.5 Signaling Relayers

Such as SIP registrars and SIP proxies, that support inbound communication via UDP, and/or via TCP, and/or via SSL/TLS. It should be noted that in the SIP protocol, if a SIP URI with transport of type TCP or TLS is used, then any SIP entity that tries to communicate with that address, will try and create an outbound connection to that address. Since, in some configurations, only outbound TCP is possible, TCP/TLS connections to SIP proxies and registrars may be persistent, and SIP messages may be sent to the connected SIP client (such as a user agent) over the persistent connection, instead of trying to connect to the TCP address.

11.4.6 Media Relayers

Since in some situations media may not be able to flow from one peer to another directly, the network may use media relayers, such as the ones mentioned in the STUN extension draft, which includes also stun messages of type Allocation, and other types of message that extend the STUN protocol to support relaying. The STUN server may support inbound connections over TCP and SSL/TLS as well.

11.5 Media Flow Optimiziation

RTP or any other standard or proprietary media communication protocol may be used. In order to optimize media flow, the network may use ICE (interactive connectivity establishment). It is an internet draft that explains a method for 2 peers to use STUN and SIP to choose the best address to send RTP packets to.

11.6 P2P Network Topology

In the P2P network topology, signaling and media relayers may also be communication clients, which have been identified by other network participants (including servers) to be able to act as signaling and media relayers. The service may setup and maintain dedicated signaling and media relayers as well.

11.7 IM Protocol

The network may any of the following protocols for instant messaging:

11.7.1 The SIP MESSAGE message,
11.7.2 SIMPLE (SIP for Instant Messaging and Presence Leveraging Extensions)
11.7.3 XMPP (Extensible Messaging and Presence Protocol)
11.7.4 IMPP (Instant Messaging d Presence Protocol)
11.7.5 Or any other standard or proprietary IM protocol.

12 Exemplary additional implementations 12.1 Broadband Phone Service Support (i.e. Vonage) and/or Enterprise VOIP Infrastructure Support 12.1.1 The client supports talking SIP with $3^{rd}$ party infrastructure.
12.1.2 In the sign on screen, the user may enter a SIP address, SIP password, specify a sign on type of SIP and an optional outbound SIP proxy.
12.1.3 Standard SIP dns resolution then starts, if an outbound SIP proxy was not configured, to locate the domain's SIP server.
12.1.4 Sign on to the domain's SIP registrar is initiated.
12.1.5 From there on, whenever a user calls a phone number, a SIP url in the format required by the domain's SIP server is constructed, and an invite is initiated. For example:

SIP:16508402222@vonage.com
or
SIP:01197236413844@vonage.com 12.1.6 The format required may be decided by a software option, downloaded from a configuration server maintained by yoomba, or all possible SIP url formats that make sense may be constructed and tried.
12.1.7 Whenever a user calls an email address, the client decides if it treats it as a SIP address, or as an email address on the network, or both.
12.1.8 The decision may be based on a software option, on user input, or on a wildcard list of domains to treat/not treat as SIP addresses and/or network addresses.
12.1.9 If the address is to be used as a SIP address, the client may send an invite request either via the outbound proxy, or use standard SIP dns resolution to try and contact the proxy server for that domain using SIP. This also can be decided by an option, by user input, or by a wildcard list of domains.
12.1.10 The user may get a "download" link, similar to the activation link, that will make the setup and configuration of the client for use with a broadband phone service or enterprise infrastructure automatic.

12.2 IP Phone Support

Most IP phones talk SIP and RTP.

12.2.1 SIP Communication

There are several exemplary SIP use scenarios here (one or more may be used in parallel):

12.2.1.1 Yoomba client acts as a back to back user agent

In that scenario, the user clicks on an email or phone number, the client sends a call invitation request, and invites the IP phone, either after the call invite request is sent, or after the call was successfully setup.

12.2.1.2 Yoomba Client Acts as an IP phone controller

The client is able to force the IP phone to send SIP call invite requests.

12.2.1.3 Yoomba Client also acts as an outbound proxy for the IP phone

Every call invite from the ip phone is routed through out client, so yoomba system can track the phone numbers called.

12.2.2 RTP Communication

Here, a client can either act as a media relay server or not. If it wishes to act as a media relay server, then in the B2BUA case, it need to insert its own RTP addresses in the SDP body (media session negotiation body) of the invitation requests it sends. In the outbound proxy case, it should overwrite the SDP body sent by the IP phone, and make sure the invite response is routed through him, and overwrite the SDP body of the INVITE response as well.

12.3 PTT (Push To Talk)

Yoomba network service may also enable this feature among users. This feature may be limited to a closed group of users, email domains, etc.—where everybody can talk with everybody, or by every user for a closed group of contacts, email domains, etc.

General

The present invention has been described using non-limiting detailed descriptions of embodiments thereof that are provided by way of example and are not intended to limit the scope of the invention. For example, the client and server software described above may be implemented in more modules than mentioned above (e.g., one or more of the tasks described above is being performed by a single module is performed by a plurality of separate cooperating modules) or in fewer modules than described above. In an exemplary embodiment of the invention, each of the client and/or server software is implemented by a single module. The software may be executed as a single process or as a plurality of cooperating processes.

The software modules may be implemented in substantially any suitable software language such as Java, Pascal, C++ or assembler and may be precompiled or may be compiled or interpreted each time the software is executed.

It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art. The present invention includes software, computer readable storage media (e.g., diskettes, USB flash memory units, CDs) on which the server and/or client software are stored, as well as computers programmed and/or configured with the above described software.

In some embodiments of the invention, rather than implementing in software, the above described tasks may be executed partially or entirely in firmware and/or hardware (for example in a client plug-in), for example in order to prevent tampering and/or copying. In relating to a computer in the above description, the description is not limited to all the tasks of the computer being performed by a single processor or by hardware (memory, disk drive, modem) included in a single housing and considered part of the computer. Rather, some of the tasks of the computer may be outsourced to co-processors internal and/or external to the computer's housing, for example by a remote unit connected over the Internet.

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

The invention claimed is:
1. A communication service network, comprising:
(a) a communication server supporting at least a first personal communication service for a plurality of users over a communication network, wherein each said user has a unique handle in said first personal communication service; and
(b) a plurality of clients supporting a second personal communication service, wherein each of said clients is to automatically send any of said plurality of users a callback request message via said first personal communication system, using said unique handle, in response to an indication that said respective user is not registered to said second personal communication service, said callback request message to the non-registered user having communication data for communicating with a user of said sending client and setup data for providing support for said second personal communication service, whereby complying by the non-registered user with the callback request message automatically causes initiation of installation of software for communicating over the second personal communication service by the non-registered user, thereby allowing a communication session over said second personal communication service with the user of said sending client after completion of said installation.
2. A network according to claim 1, wherein said second service is managed by an entity not affiliated with first communication service.
3. A network according to claim 1, wherein said first service comprises a multi-provider service.
4. A network according to claim 1, wherein said second communication service is of a type different from said first communication service.
5. A network according to claim 4, wherein said services differ in a protocol used.
6. A network according to claim 4, wherein said services differ in a media carried.
7. A network according to claim 4, wherein said services differ in degree of real-time.
8. A network according to claim 1, wherein said first communication service comprises e-mail.
9. A network according to claim 1, wherein said first communication service comprises telephone communication.
10. A network according to claim 1, comprising at least one server which manages a mapping between said unique handle and a handle used internally by said second communication service.
11. A network according to claim 1, wherein said second communication service is managed as a peer-to-peer network in which clients direct data content of messages directly from one to another or via one or more relaying peer over said network.
12. A network according to claim 1, comprising a set-up server configured to validate and register new users of said second service based on said unique handle.
13. A network according to claim 1, comprising at least one gateway accessible to said clients for communication with a third personal communication service.
14. A network according to claim 1, wherein at least one of said clients is configured to add controls for using said second communication service on existing software displays showing said unique handle.
15. A network according to claim 14, wherein the existing software comprises a client for said first communication service.
16. A network according to claim 14, wherein at least one of said controls shows presence information.
17. A network according to claim 1, wherein at least one of said clients is configured to import contact information used for said first communication service for use with said second communication service.
18. A network according to claim 1, wherein at least one of said clients is configured to import contact information used for communication services other than said second communication service for use with said second communication service.
19. A network according to claim 1, wherein at least one of said clients is configured to track contact information use for communication services other than said second service, on user computers on which the client is installed.
20. A network according to claim 1, wherein at least one of said clients is configured to import contact information for communication services other than said second service, on user computers on which the client is installed.
21. A network according to claim 1, wherein at least one of said clients is configured to mirror contact information for communication services other than said second service, on user computers on which the client is installed.
22. A network according to claim 1, wherein at least one of said clients is configured to facilitate the set up of a conference call with multiple users of said first service, that are not users of said second service, and users of said second service, inviting said users to said conference call.
23. A network according to claim 22, wherein at least one of said users are users of a third communication service and wherein said set-up comprises connecting the conference to said third service.
24. A network according to claim 1, wherein at least one of said clients is provided bundled with a wireless portable communication device.
25. A network according to claim 1, wherein at least one of said clients is configured on a terminal of said terminals to display media to a user during a communication via the second communication service.
26. A network according to claim 1, wherein at least one of said clients is configured to analyze a target computer during an installation process to identify communication software to be dealt with during usage of said client.
27. A network according to claim 26, wherein said client is configured to detect webmail usage.
28. A network according to claim 26, wherein said client is configured to detect e-mail client.
29. A network according to claim 1, wherein said unique handle is selected from a group consisting of an email address, a landline number, a mobile number, and an instant messaging (IM) handle.
30. A network according to claim 29, wherein said second communication service is a voice based personal communication service.
31. The system of claim 1, wherein the communication session is a video communication session.
32. The system of claim 1, wherein the communication session is an audio communication session.
33. The system of claim 1, wherein the first personal communication service is a non-real-time communication service and the communication session is a real-time communication session.
34. The communication service network of claim 1, wherein said callback request message to the non-registered user further causes automatic initiation of a communication session over said second personal communication service with the user of said sending client after completion of said installation.

35. A method of communicating with a user using a second communication service, comprising:
   (a) selecting by a first user a second user with whom to communicate using a second communication service, said selecting being done without knowing by said first user whether said second user is registered to said second communication service;
   (b) attempting to set up a communication session under said second communication service with said second user, via a software client of said first user, using a unique handle of said second user on a first personal communication system;
   (c) detecting whether said second user is not registered to said second communication service; and
   (d) if said second user is not registered to said second communication service, then automatically sending said second user a callback request message under said first personal communication system, using said unique handle, said callback request message having communication data for communicating with said first user and setup data for providing support for said second communication service, whereby complying by the second user with the callback request automatically causes initiation of installation of software for communicating over the second personal communication service by the non-registered user, thereby allowing a communication session with the first user over said second communication service after completion of said installation.

36. A method according to claim 35, wherein said callback uses a communication protocol supported by said second communication service.

37. A method according to claim 35, comprising completing said communication by said second user activating a control in said message, which control causes the setting up of said second user with said second communications service, said setting up including noting to call back said first user.

38. A method according to claim 37, wherein said setting up culminates in an attempt to call back said first user, using said second communication service, based on said noted callback request.

39. A method according to claim 38, wherein said setup does not require any user input of information not known to said second communication service, to set up the second user.

40. The method of claim 35, wherein the communication session is a video communication session.

41. The method of claim 35, wherein the communication session is an audio communication session.

42. The method of claim 35, wherein the first personal communication service is a non-real-time text-based communication service and the communication session is a real-time communication session.

43. The method of claim 35 further comprising after installation of said software for communicating over the second personal communication service, automatically initiating a communication session with the first user over said second communication service.

* * * * *